(12) United States Patent
Christopher et al.

(10) Patent No.: US 8,895,145 B2
(45) Date of Patent: Nov. 25, 2014

(54) HYDROPHOBIC SILICA PARTICLES AND METHOD OF PRODUCING SAME

(75) Inventors: Alyson M. Christopher, Waltham, MA (US); George Eid, Nashua, NH (US); Joachim K. Floess, Urbana, IL (US); Dmitry Fomitchev, Lexington, MA (US); Jincheng Xiong, Boxborough, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 13/639,548

(22) PCT Filed: Apr. 1, 2011

(86) PCT No.: PCT/US2011/000587
§ 371 (c)(1),
(2), (4) Date: Oct. 16, 2012

(87) PCT Pub. No.: WO2011/126552
PCT Pub. Date: Oct. 13, 2011

(65) Prior Publication Data
US 2013/0029258 A1 Jan. 31, 2013

Related U.S. Application Data

(63) Continuation-in-part of application No. 12/798,540, filed on Apr. 6, 2010, now abandoned.

(51) Int. Cl.
*B32B 9/04* (2006.01)
*G03G 9/097* (2006.01)

(52) U.S. Cl.
CPC ................................. *G03G 9/09725* (2013.01)
USPC ......................................... 428/405; 523/212

(58) Field of Classification Search
USPC .......................................... 428/405; 523/212
See application file for complete search history.

(56) References Cited

U.S. PATENT DOCUMENTS

| | | | |
|---|---|---|---|
| 4,868,084 A | 9/1989 | Uchide et al. | |
| 4,950,502 A | 8/1990 | Saam et al. | |
| 5,013,585 A | 5/1991 | Shimizu et al. | |
| 5,039,736 A | 8/1991 | Fujiki | |
| 5,486,420 A | 1/1996 | Nishihara et al. | |
| 5,520,917 A * | 5/1996 | Mizuguchi et al. | 424/401 |
| 5,756,788 A | 5/1998 | Mitchnick et al. | |
| 5,824,739 A | 10/1998 | Kondo et al. | |
| 5,843,525 A | 12/1998 | Shibasaki et al. | |
| 5,908,660 A | 6/1999 | Griffith et al. | |
| 6,022,404 A | 2/2000 | Ettlinger et al. | |
| 6,051,672 A | 4/2000 | Burns et al. | |
| 6,184,408 B1 | 2/2001 | Burns et al. | |
| 6,200,580 B1 * | 3/2001 | Horino et al. | 424/401 |
| 6,503,676 B2 | 1/2003 | Yamashita et al. | |
| 6,602,945 B2 * | 8/2003 | Kobayashi et al. | 524/492 |
| 6,623,791 B2 | 9/2003 | Sadvary et al. | |
| 6,830,811 B2 | 12/2004 | Chao | |
| 6,899,951 B2 | 5/2005 | Panz et al. | |
| 7,022,375 B2 | 4/2006 | Schachtely et al. | |
| 7,109,256 B2 | 9/2006 | Amano et al. | |
| 7,255,735 B2 | 8/2007 | Meyer et al. | |
| 7,262,233 B2 | 8/2007 | Isarov et al. | |
| 7,276,615 B2 | 10/2007 | Gottschalk-Gaudig et al. | |
| 7,332,144 B2 | 2/2008 | Konya et al. | |
| 7,390,349 B2 | 6/2008 | Lautamo | |
| 7,449,193 B2 * | 11/2008 | Kanemaru et al. | 424/401 |
| 7,553,889 B2 | 6/2009 | Christian et al. | |
| 7,612,137 B2 | 11/2009 | Brinkmann et al. | |
| 7,641,972 B2 | 1/2010 | Nolte et al. | |
| 7,811,540 B2 | 10/2010 | Adams | |
| 2006/0050130 A1 | 3/2006 | Yoshida et al. | |
| 2007/0071980 A1 | 3/2007 | Kamei et al. | |
| 2008/0064790 A1 | 3/2008 | Canpont et al. | |
| 2008/0069753 A1 | 3/2008 | Floess et al. | |
| 2008/0070140 A1 | 3/2008 | Fomitchev et al. | |
| 2008/0095698 A1 | 4/2008 | Fomitchev | |
| 2009/0311159 A1 | 12/2009 | Gray | |
| 2011/0177446 A1 | 7/2011 | Kaneeda | |

FOREIGN PATENT DOCUMENTS

| EP | 0869762 | 7/2003 |
|---|---|---|
| WO | WO 2010/038538 | 4/2010 |

OTHER PUBLICATIONS

International Preliminary Report on Patentability for International Application No. PCT/US2011/000587, mailed on Oct. 18, 2012.
Abstract only of JP 59-172553, Sep. 1984, Sakatani, et al.
Abstract only of JP 2000066439A, Mar. 3, 2000, Matsushita Electric Ind Co. Ltd.
Castaing, J.-C. et al. "Nanosized hairy grains: A model system to understand the reinforcement," Europhysics Letters, 36 (2), Oct. 10, 1996, pp. 153-158.
Chao, Timothy C. et al. "Silyation of Partially Aggregrated Colloidal Silica Nanoparticles for Reinforcement in Silicone Elastomers," Mat. Res. Soc. Symp. Proc. vol. 778: Materials Research Society, 2003, pp. U5.11.1-U5.11.6.
Dvornic, Petar R., "Thermal Properties of Polysiloxanes," in RG Jones et al. (Eds), Silicon-containing polymers, Netherlands: Kluwer Academic Publishers, 2000, pp. 185-212.
International Search Report and Written Opinion of the International Searching Authority, or the Declaration for International Application No. PCT/US2011/000587, mailed on Dec. 27, 2011.

* cited by examiner

*Primary Examiner* — Margaret Moore

(57) ABSTRACT

Hydrophobic silica particles are produced by reacting them with a hydrosiloxane agent.

30 Claims, 2 Drawing Sheets

M  D  T  Q

HYDROPHOBIC SILICA PARTICLES AND METHOD OF PRODUCING SAME

This application is a §371 national phase application of and claims priority to PCT/US2011/00587, filed on Apr. 1, 2011, which is a Continuation-in-Part of U.S. patent application Ser. No. 12/798,540, filed on Apr. 6, 2010.

BACKGROUND OF THE INVENTION

1. Field of the Invention

This invention relates to hydrophobizing silica particles, including colloidal silica, and, more particularly, to hydrophobizing silica particles with hydrosiloxane agents.

2. Description of the Related Art

Electrophotographic image formation comprises developing an electrostatic latent image formed on a photoreceptor with a toner comprising a colorant dispersed in a binder resin, transferring the toner image to a receiving paper, and fixing the transferred toner image by means of, for example, a hot roll. The photoreceptor is cleaned after the transferring step to prepare for the next latent image formation.

Silica particles are often combined with toner particles in order to improve selected properties of the toner particles, including fluidity, transferability, fixability, and cleaning properties. Typically, the silica particles are subjected to a chemical treatment to render the surface of the particles hydrophobic. Many different methods are known for treating the surface of silica particles.

Traditionally, silica particles have been treated with a variety of agents, for example, polydimethylsiloxane (PDMS), in fluidized bed reactors at elevated temperatures, e.g. 250-300° C. At these elevated temperatures, two processes take place simultaneously: (i) depolymerization of the polymer into smaller volatile fragments (e.g., D3 and D4) that evaporate from the system and (ii) oxidation of methyl groups, breaking the methyl-silicon bond (see Dvornic, "Thermal Properties of Polysiloxanes," in *Silicon Containing Polymers*, Jones, et al., eds., Netherlands: Kluwer Academic Publishers, 2000, pp 185-212). Removal of the methyl group frees the silicon atom to react with silanol and siloxane groups on the silica surface, and the polymer also adsorbs non-covalently to the particle (see U.S. Pat. No. 6,503,676). U.S. Pat. No. 6,899,951 discloses conditioning mixtures of organopolysiloxanes with precipitated silicas; the polymer attaches to the silica surface via the siloxane bridges of the polymer.

Recently, it has been shown that colloidal silicas can be treated with small molecule agents, e.g., hexamethyldisilazane and alkoxysilanes, in aqueous media (see U.S. Patent Publications Nos. 2006/0171872 and 2008/0070140). Siloxanes may be employed to increase the hydrophobicity of the surface. For example, U.S. Pat. Nos. 6,830,811 and 6,184,408 disclose treatment of silica particles with short dimethylsiloxane oligomers. The reactions are carried out under acidic conditions under which the oligomers are cleaved. Thus, siloxane groups are attached to the surface.

However, it is desirable to treat toner additives with higher molecular weight silicones to provide additional hydrophobicity and reduce surface energy. It is further desirable to provide a surface treatment that will be stable with respect to organic solvents and polymers that can extract adsorbed hydrophobic compounds from the surface of silica toner additives. It is further desirable to provide a surface treatment for silica particles that reduces water adsorption.

SUMMARY OF THE INVENTION

The use of hydrosiloxane co-polymers to treat silica particles has been shown to increase the amount of hydrophobizing material that is attached to the surface of these particles, in comparison to PDMS treatment. The attachment of hydrosiloxane co-polymers to silica particles, including certain colloidal silicas, has been shown to reduce the water adsorption of these materials significantly.

In one aspect, the invention is a method of preparing hydrophobic silica particles. The method includes:

a) providing a hydrosiloxane agent having the following formula

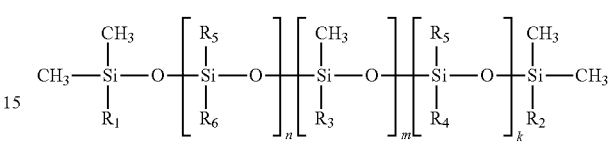

wherein $R_1 =$ —H, —$CH_3$, $R_2 =$ —H, —$CH_3$, $R_3 =$ —$CH_3$, —$CH_2CH_3$, —$CH_2CH_2CH_3$, —$CH_2Ar$, —$CH_2CH_2Ar$, —Ar, —$CH_2CH_2CF_3$, or —$CH_2CH_2$—$R_f$ with $R_f$ being a $C_1$ to $C_8$ perfluoroalkyl group, $R_4 =$ —$CH_3$, —$CH_2CH_3$, —$CH_2CH_2CH_3$, —$CH_2CH_2CF_3$, or —$CH_2CH_2$—$R_f$ with $R_f$ being a $C_1$ to $C_8$ perfluoroalkyl group, $R_5 =$ —$CH_3$, —$CH_2CH_3$, —$CH_2Ar$, —$CH_2CH_2Ar$, or —Ar, $R_6 =$ —H, —OH, —$OCH_3$, or —$OCH_2CH_3$, Ar is unsubstituted phenyl or phenyl substituted with one or more methyl, halogen, ethyl, trifluoromethyl, pentafluoromethyl, or —$CH_2CF_3$ groups, n, m, and k are integer numbers; $n \geq 1$, $m \geq 0$ $k \geq 0$ with the proviso that when $m=k=0$, at least one of $R_1$ and $R_2$ is —$CH_3$, and wherein the hydrosiloxane agent has a molecular weight from 208 to about 20,000; b) contacting silica particles with the hydrosiloxane agent in the presence of a solvent, the solvent, silica particles, and hydrosiloxane agent forming a reaction mixture and wherein, when $R_6$ is —H, the solvent comprises at least one of water, methanol, and ethanol; and c) drying the reaction mixture to provide hydrophobic silica particles.

The reaction mixture may further include a base or an acid. Step b) may include dispersing the hydrosiloxane agent in an aqueous dispersion of the silica particles, and the dispersed silica particles may be non-aggregated. The reaction mixture may include a second treatment agent, and the second treatment agent may be added to the reaction mixture in step b). The method may further include combining a second treatment agent with a dispersion of the silica particles before step b). The second treatment agent may be a hydrophobizing agent or a charge modifying agent.

Step a) may include modifying a hydrosiloxane precursor having the following formula:

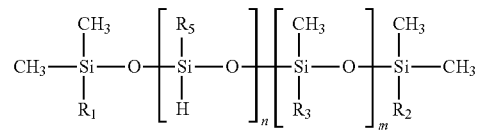

wherein $R_1 =$ —H, —$CH_3$, $R_2 =$ —H, —$CH_3$, $R_3 =$ —$CH_3$, —$CH_2CH_3$, —$CH_2CH_2CH_3$, —$CH_2Ar$, —$CH_2CH_2Ar$, —Ar, —$H_2CH_2CF_3$, or —$CH_2CH_2$—$R_f$ with $R_f$ being a $C_1$ to $C_8$ perfluoroalkyl group, $R_4 =$ —$CH_3$, —$CH_2CH_3$, —$CH_2CH_2CH_3$, —$CH_2CH_2CF_3$, or —$CH_2CH_2$—$R_f$ with $R_f$ being a $C_1$ to $C_8$ perfluoroalkyl group, $R_5 =$ —$CH_3$, —$CH_2CH_3$, —$CH_2Ar$, —$CH_2CH_2Ar$, or —Ar, Ar is unsubstituted phenyl or phenyl substituted with one or more methyl, halogen, ethyl, trifluoromethyl, pentafluoromethyl, or —CH$_2$CF$_3$ groups, n and m are integer numbers; n≥1, m≥0 with the proviso that when m=0, at least one of R$_1$ and R$_2$ is —CH$_3$, and wherein the hydrosiloxane precursor has a molecular weight from 208 to about 20,000, by chemically modifying at least a portion of the Si—H groups. Chemically modifying may include replacing the hydride on at least a portion of the Si—H groups with at least one of an alkoxide, a hydroxide, or R$_4$.

The solvent may include a water-miscible organic solvent. The silica particles in step b) may have a particle size of about 5 nm to about 600 nm and may be colloidal silica particles, fumed silica particles, co-fumed silica particles, or precipitated silica particles.

In another aspect, the invention is hydrophobic silica particles prepared by a method including a) providing a hydrosiloxane agent having the following formula

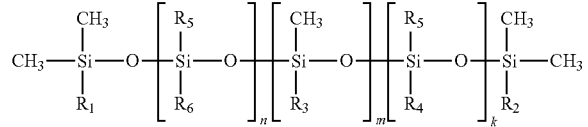

wherein R$_1$=—H, —CH$_3$, R$_2$=—H, —CH$_3$, R$_3$=—CH$_3$, —CH$_2$CH$_3$, —CH$_2$CH$_2$CH$_3$, —CH$_2$Ar, —CH$_2$CH$_2$Ar, —Ar, —CH$_2$CH$_2$CF$_3$, or —CH$_2$CH$_2$—R$_f$ with R$_f$ being a C$_1$ to C$_8$ perfluoroalkyl group, R$_4$=—CH$_3$, —CH$_2$CH$_3$, —CH$_2$CH$_2$CH$_3$, —CH$_2$CH$_2$CF$_3$, or —CH$_2$CH$_2$—R$_f$ with R$_f$ being a C$_1$ to C$_8$ perfluoroalkyl group, R$_5$=—CH$_3$, —CH$_2$CH$_3$, —CH$_2$Ar, —CH$_2$CH$_2$Ar, or —Ar, R$_6$=—H, —OH, —OCH$_3$, or —OCH$_2$CH$_3$, Ar is unsubstituted phenyl or phenyl substituted with one or more methyl, halogen, ethyl, trifluoromethyl, pentafluoromethyl, or —CH$_2$CF$_3$ groups, n, m, and k are integer numbers; n≥1, m≥0, k≥0, with the proviso that when m=k=0, at least one of R$_1$ and R$_2$ is —CH$_3$, and wherein the hydrosiloxane agent has a molecular weight from 208 to about 20,000; b) contacting silica particles with the hydrosiloxane agent in the presence of a solvent, the solvent, silica particles, and hydrosiloxane agent forming a reaction mixture and wherein, when R$_6$ is —H, the solvent comprises at least one of water, methanol, and ethanol; and c) drying the reaction mixture to provide the hydrophobic silica particles.

Step b) may include dispersing the hydrosiloxane agent in an aqueous dispersion of the silica particles. The reaction mixture may include a second treatment agent. The second treatment agent may be added to the reaction mixture or combined with a dispersion of the silica particles before step b).

Step a) may include modifying a hydrosiloxane precursor having the following formula:

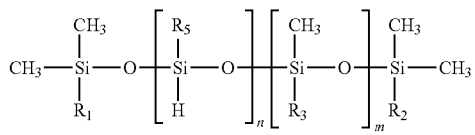

wherein R$_1$=—H, —CH$_3$, R$_2$=—H, —CH$_3$, R$_3$=—CH$_3$, —CH$_2$CH$_3$, —CH$_2$CH$_2$CH$_3$, —CH$_2$Ar, —CH$_2$CH$_2$Ar, —Ar, —CH$_2$CH$_2$CF$_3$, or —CH$_2$CH$_2$—R$_f$ with R$_f$ being a C$_1$ to C$_8$ perfluoroalkyl group, R$_4$=—CH$_3$, —CH$_2$CH$_3$, —CH$_2$CH$_2$CH$_3$, —CH$_2$CH$_2$CF$_3$, or —CH$_2$CH$_2$—R$_f$ with R$_f$ being a C$_1$ to C$_8$ perfluoroalkyl group, R$_5$=—CH$_3$, —CH$_2$CH$_3$, —CH$_2$Ar, —CH$_2$CH$_2$Ar, or —Ar, Ar is unsubstituted phenyl or phenyl substituted with one or more methyl, halogen, ethyl, trifluoromethyl, pentafluoromethyl, or —CH$_2$CF$_3$ groups, n and m are integer numbers; n≥1, m≥0, with the proviso that when m=0, at least one of R$_1$ and R$_2$ is —CH$_3$, and wherein the hydrosiloxane precursor has a molecular weight from 208 to about 20,000, by chemically modifying at least a portion of the Si—H groups. Chemically modifying may include replacing the hydride on at least a portion of the Si—H groups with at least one of an alkoxide, a hydroxide, or R$_4$.

In another embodiment, the invention is a particle composition including the reaction product of silica particles and at least a hydrosiloxane agent having the formula

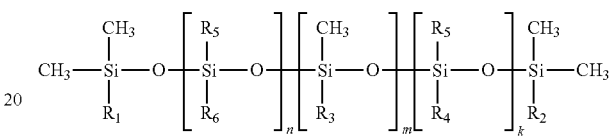

wherein R$_1$=—H, —CH$_3$, R$_2$=—H, —CH$_3$, R$_3$=—CH$_3$, —CH$_2$CH$_3$, —CH$_2$CH$_2$CH$_3$, —CH$_2$Ar, —CH$_2$CH$_2$Ar, —Ar, —CH$_2$CH$_2$CF$_3$, or —CH$_2$CH$_2$—R$_f$ with R$_f$ being a C$_1$ to C$_8$ perfluoroalkyl group, R$_4$=—CH$_3$, —CH$_2$CH$_3$, —CH$_2$CH$_2$CH$_3$, —CH$_2$CH$_2$CF$_3$, or —CH$_2$CH$_2$—R$_f$ with R$_f$ being a C$_1$ to C$_8$ perfluoroalkyl group, R$_5$=—CH$_3$, —CH$_2$CH$_3$, —CH$_2$Ar, —CH$_2$CH$_2$Ar, or —Ar, R$_6$=—H, —OH, —OCH$_3$, or —OCH$_2$CH$_3$, Ar is unsubstituted phenyl or phenyl substituted with one or more methyl, halogen, ethyl, trifluoromethyl, pentafluoromethyl, or —CH$_2$CF$_3$ groups, n, m, and k are integer numbers; n≥1, m≥1, and wherein the hydrosiloxane agent has a molecular weight from 282 to about 20,000.

The particle composition may be the reaction product of silica particles with a hydrosiloxane agent and a second treatment agent. The second treatment agent may be a hydrophobizing agent or a charge-modifying agent. The silica particles may have a particle size of about 5 nm to about 600 nm and may be colloidal silica particles, fumed silica particles, co-fumed silica particles, or precipitated silica particles. The reaction product may be in the form of a dry powder.

In another aspect, the invention is a toner composition including toner particles and the reaction product of silica particles and at least a hydrosiloxane agent having the formula

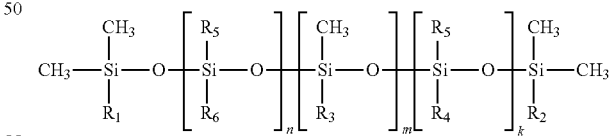

wherein R$_1$=—H, —CH$_3$, R$_2$=—H, —CH$_3$, R$_3$=—CH$_3$, —CH$_2$CH$_3$, —CH$_2$CH$_2$CH$_3$, —CH$_2$Ar, —CH$_2$CH$_2$Ar, —Ar, —CH$_2$CH$_2$CF$_3$, or —CH$_2$CH$_2$—R$_f$ with R$_f$ being a C$_1$ to C$_8$ perfluoroalkyl group, R$_4$=—CH$_3$, —CH$_2$CH$_3$, —CH$_2$CH$_2$CH$_3$, —CH$_2$CH$_2$CF$_3$, or —CH$_2$CH$_2$—R$_f$ with R$_f$ being a C$_1$ to C$_8$ perfluoroalkyl group, R$_5$=—CH$_3$, —CH$_2$CH$_3$, —CH$_2$Ar, —CH$_2$CH$_2$Ar, or —Ar, R$_6$=—H, —OH, —OCH$_3$, or —OCH$_2$CH$_3$, Ar is unsubstituted phenyl or phenyl substituted with one or more methyl, halogen, ethyl, trifluoromethyl, pentafluoromethyl, or —CH$_2$CF$_3$ groups, n, m, and k are integer numbers; n≥1, m≥0, k≥0, with the proviso that when m=k=0, at least one of $R_1$ and $R_2$ is —$CH_3$, and wherein the hydrosiloxane agent has a molecular weight from 208 to about 20,000.

The reaction product may be the reaction product of silica particles and both a hydrosiloxane agent and a second treatment agent, and the second treatment agent may be a hydrophobizing agent or a charge-modifying agent. The silica particles may have a particle size of about 5 nm to about 600 nm.

The silica particles may be colloidal silica particles, fumed silica particles, co-fumed silica particles, or precipitated silica particles.

It is to be understood that both the foregoing general description and the following detailed description are exemplary and explanatory only and are intended to provide further explanation of the present invention, as claimed.

BRIEF DESCRIPTION OF THE DRAWING

The invention is described with reference to the several figures of the drawing, in which.

DETAILED DESCRIPTION OF THE INVENTION

Figure 1:
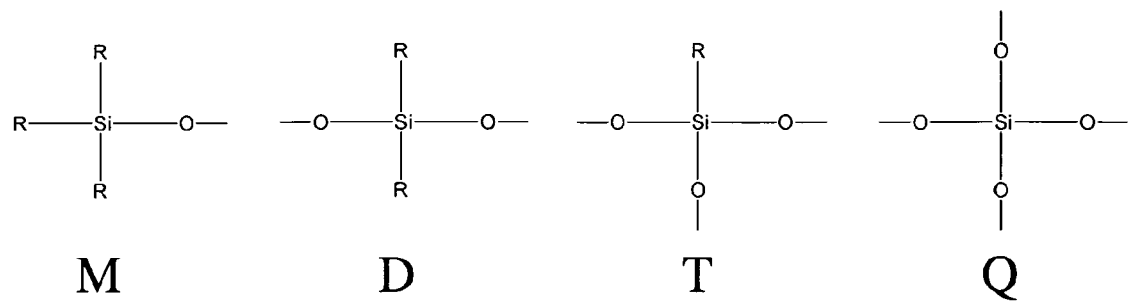
FIG. 1 is a schematic diagram of the structure of various siloxane functional groups identified by $^{29}$Si NMR.

In one embodiment, a particle composition is provided that is the reaction product of silica particles and at least a hydrosiloxane agent having the formula

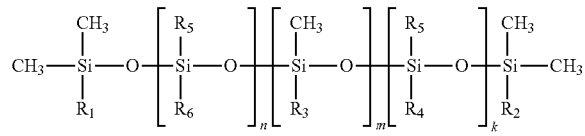

wherein $R_1$=—H, —$CH_3$; $R_2$=—H, —$CH_3$; $R_3$=—$CH_3$, —$CH_2CH_3$, —$CH_2CH_2CH_3$, —$CH_2Ar$, —$CH_2CH_2Ar$, —Ar, —$CH_2CH_2CF_3$, or —$CH_2CH_2$—$R_f$ with $R_f$ being a $C_1$ to $C_8$ perfluoroalkyl group; $R_4$=—$CH_3$, —$CH_2CH_3$, —$CH_2CH_2CH_3$, —$CH_2CH_2CF_3$, or —$CH_2CH_2$—$R_f$ with $R_f$ being a $C_1$ to $C_8$ perfluoroalkyl group; $R_5$=—$CH_3$, —$CH_2CH_3$, —$CH_2Ar$, —$CH_2CH_2Ar$, or —Ar; $R_6$=—H, —OH, —$OCH_3$, or —$OCH_2CH_3$; Ar is unsubstituted phenyl or phenyl substituted with one or more methyl, halogen, ethyl, trifluoromethyl, pentafluoromethyl, or —$CH_2CF_3$ groups; n, m, and k are integer numbers; n≥1 (for example, n≥2, 3, 4, or 5), m≥0, k≥0, with the proviso that when m=k=0, at least one, of $R_1$ and $R_2$ is —$CH_3$, for example, both of $R_1$ and $R_2$ are —$CH_3$, and wherein the hydrosiloxane agent has a number average molecular weight from 208 to about 20,000. In certain embodiments, m≥1, and the hydrosiloxane agent has a number average molecular weight of at least 282. Alternatively or in addition, m≥2, 3, 4, or 5.

The hydrosiloxane agent is a co-multimer (e.g., a co-polymer) including at least one mer having an dialkyl- and/or arylalkylsilane group (or that is terminated with an alkylated or aralkylated silane) and at least one mer having a leaving group such as hydride or alkoxide. The three types of mers in the hydrosiloxane agent may be arranged in blocks (including more than three blocks, for example, multiple blocks of each type of mer) or randomly. The depiction of the three types of mers in the formula above is not meant to indicate a block copolymer but rather the relative numbers n, m, and k of each kind of mer, regardless of arrangement.

The silicon atom in the mers containing an $R_6$ group can react to form a bond directly to the surface of a silica particle. Mers including methyl, $R_4$, and $R_5$ groups help impart additional hydrophobicity to silica particles with which the hydrosiloxane agent is reacted. The presence in the hydrosiloxane agent of multiple mers having a leaving group provides multiple points of attachment for the hydrosiloxane agent to the surface of a silica particle without necessarily cleaving the siloxane backbone. In addition, the leaving group renders the hydrosiloxane agent more soluble in aqueous solvent than siloxane chains of similar molecular weight but having only aliphatic pendant groups (e.g., polydimethylsiloxane, or PDMS), thereby enabling reactions with aqueous dispersions of silica particles or dispersions in mixed solvents including water.

In contrast, the primary mechanism for attachment of PDMS is via hydrolysis of the siloxane (Si—O—Si) bonds, which breaks up the polymer into shorter oligomers. The resulting terminal silanol groups then react via condensation to attach the oligomers to the surface. While this mechanism is still important for the hydrosiloxane agent, it is believed that another important mechanism for attachment is via reaction at the $R_6$ group, a mechanism that is not available to PDMS-type polymers.

In certain embodiments, the number average molecular weight of the hydrosiloxane agent may be at least about 265, at least about 325, at least about 340, at least about 385, at least about 400, at least about 445, at least about 460, at least about 505, at least about 520, at least about 565, at least about 625, at least about 700, at least about 775, at least about 850, or at least about 900 (e.g., about 900 to about 950, about 950 to about 1000, about 1000 to about 1500, about 1500 to about 2000, about 2000 to about 2500, about 2500 to about 3000, about 3000 to about 3500, about 3500 to about 4000, about 4000 to about 5000, about 5000 to about 6000, about 6000 to about 7000, about 7000 to about 8000, about 8000 to about 9000, about 9000 to about 10000, about 10000 to about 12500, about 12500 to about 15000, about 15000 to about 17500, or about 17500 to about 20000).

In certain embodiments, the viscosity of the hydrosiloxane agent is from about 5 to about 50 cSt. For example, the viscosity may be from about 5 to about 10 cSt, from about 10 to about 15 cSt, from about 15 to about 20 cSt, from about 20 to about 25 cSt, from about 25 to about 30 cSt, from about 30 to about 35 cSt, from about 35 to about 40 cSt, from about 40 to about 45 cSt, or from about 45 to about 50 cSt.

In certain embodiments, the sum of n, m, and k is at least 1, at least 2, at least 3, at least 4, at least 5, at least 6, at least 7, at least 8, at least 9, at least 10, at least 11, at least 12, at least 13, at least 14, or at least 15. For example, the sum of n, m, and k may be from 15 to 330 (e.g., about 15 to about 20, about 20 to about 30, about 30 to about 40, about 40 to about 50, about 50 to about 60, about 60 to about 70, about 70 to about 80, about 80 to about 90, about 90 to about 100, about 100 to about 125, about 125 to about 150, about 150 to about 175, about 175 to about 200, about 200 to about 230, about 230 to about 260, about 260 to about 300, or about 200 to about 330). In this or any other embodiment, the proportion of n groups, i.e., n/(n+m+k), may be at least about 5%, at least about 10%, at least about 15%, at least about 20%, at least about 30%, at least about 40%, or at least about 50%.

"Hydrophobic" silica particles, as the term is used herein, encompasses varying levels or degrees of hydrophobicity. The degree of hydrophobicity imparted to the silica particles will vary depending upon the type and amount of treating agent used.

Preferably, the silica particles to be treated are fumed, co-fumed, precipitated, or colloidal silica particles. The silica particles may be produced utilizing techniques known to those skilled in the art. See, e.g., Kodas and Hampden-Smith, *Aerosol Processing of Materials*, Wiley-VCH, 1998. The production of a fumed metal oxide is a well-documented process which involves the hydrolysis of suitable feed stock vapor (such as silicon tetrachloride) in a flame of hydrogen and oxygen. Molten particles of roughly spherical shape are formed in the combustion process, and the particle diameters may be varied through control of process parameters. These molten spheres, referred to as primary particles, fuse with one another by undergoing collisions at their contact points to form branched, three dimensional chain-like aggregates. The formation of the aggregates is considered to be irreversible as a result of the fusion between the primary particles. During cooling and collecting, the aggregates undergo further collisions that may result in some mechanical entanglements to form agglomerates. These agglomerates are thought to be loosely held together by van der Waals forces and can be reversed, i.e. de-agglomerated, by proper dispersion in a suitable media. Mixed or co-fumed silica particles may also be produced utilizing conventional techniques known to those skilled in the art including, for example, those described in GB 2296915A to Ettlinger et al., the specification of which is incorporated herein in its entirety by reference, e.g., the silica particles described herein may include other oxides such as those of aluminum, titanium, zirconium, iron, niobium, vanadium, tungsten, tin, or germanium. Such aggregates may be formed by introducing appropriate feed stocks (e.g. chloride compounds) into a flame in conjunction with an appropriate fumed silica feed stock.

Non-limiting examples of fumed silica particles include CAB-O-SIL® fumed silica available from Cabot Corporation, HDK® fumed silica products available from Wacker Chemie AG, and AEROSIL® fumed silica available from Evonik Corporation. Fumed silica particles are also commercially available in dispersed form, for example, including CAB-O-SPERSE® products available from Cabot Corporation and AERODISP® products available from Evonik Corporation.

Precipitated silica particles may be manufactured utilizing conventional techniques and are often formed by the coagulation of the desired particles from an aqueous medium under the influence of high salt concentrations, acids, or other coagulants. The silica particles are filtered, washed, dried, and separated from residues of other reaction products by conventional techniques known to those skilled in the art. Precipitated particles are often aggregated in the sense that numerous primary particles coagulate to one another to form a somewhat spherical aggregated cluster. Those of ordinary skill in the art will readily recognize that such aggregated clusters are structurally different from fumed or pyrogenically prepared particles, which are chain-like structures of aggregated primary particles in which the primary particles are fused to one another. Non-limiting examples of commercially available precipitated silicas include Hi-Sil® products from PPG Industries, Inc. and SIPERNAT® products available from Evonik Corporation.

Colloidal silicas are commercially available or can be prepared by known methods from various starting materials (e.g., wet-process type silicas). Colloidal silica particles are typically fabricated in a manner similar to precipitated silica particles (i.e., they are coagulated from an aqueous medium) but remain dispersed in a liquid medium (often water alone or with a co-solvent and/or stabilizing agent). Silica particles can be prepared, for example, from silicic acid derived from an alkali silicate solution having a pH of about 9 to about 11, wherein the silicate anions undergo polymerization to produce discrete silica particles having the desired average particle size in the form of an aqueous dispersion. Typically, the colloidal silica starting material will be available as a sol, which is a dispersion of colloidal silica in a suitable solvent, most often water alone or with a co-solvent and/or stabilizing agent. See, e.g., Stoeber, et al., "Controlled Growth of Monodisperse Silica Spheres in the Micron Size Range," *Journal of Colloid and Interface Science*, 26, 1968, pp. 62-69, and Akitoshi Yoshida, Silica Nucleation, Polymerization, and Growth Preparation of Monodispersed Sols, in *Colloidal Silica Fundamentals and Applications*, pp 47-56 (H. E. Bergna & W. O. Roberts, eds., 2006). Non-limiting examples of commercially available colloidal silica suitable for use in the invention include SNOWTEX® products from Nissan Chemical, NexSil™ and NexSil A™ series products available from Nyacol Nanotechnologies, Inc., Quartron™ products available from Fuso Chemical, and Levasil products available from H. C. Starck.

Colloidal silica particles may have a primary particle size from about 5 to about 600 nm, for example, from about 5 to about 10 nm, from about 10 to about 30 nm, from about 30 to about 50 nm, from about 50 to about 70 nm, from about 70 to about 100 nm, from about 100 to about 150 nm, from about 150 to about 200 nm, from about 200 to about 250 nm, from about 250 to about 300 nm, from about 300 to about 350 nm, from about 350 to about 400 nm, from about 400 to about 450 nm, from about 450 to about 500 nm, from about 500 to about 550 nm or from about 550 to about 600 nm. The silica particles may be non-aggregated (e.g., substantially spherical) or slightly aggregated. For example, the ratio of the aggregate diameter to the primary particle diameter may be from about 1.5 to about 3, for example, from about 1.5 to about 1.8, from about 1.8 to about 2.1, from about 2.1 to about 2.5, from about 2.5 to about 2.8, or from about 2.8 to about 3.

Any of the silica particles described above may have a BET surface area (ASTM D6556-07) of about 2 to about 400 m$^2$/g, for example, from about 2 m$^2$/g to about 5 m$^2$/g, from about 5 m$^2$/g to about 10 m$^2$/g, from about 10 m$^2$/g to about 25 m$^2$/g, from about 25 m$^2$/g to about 50 m$^2$/g, from about 50 m$^2$/g to about 100 m$^2$/g, from about 100 m$^2$/g to about 150 m$^2$/g, from about 150 m$^2$/g to about 200 m$^2$/g, from about 200 m$^2$/g to about 250 m$^2$/g, from about 250 m$^2$/g to about 300 m$^2$/g, from about 300 m$^2$/g to about 350 m$^2$/g, or from 350 m$^2$/g to about 400 m$^2$/g.

In another embodiment, a method is provided for preparing hydrophobic silica particles. The method includes providing a hydrosiloxane agent having the formula

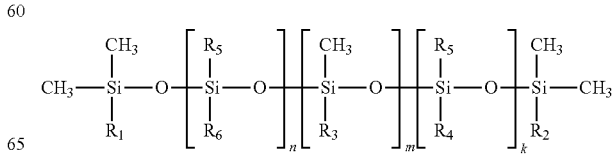

wherein $R_1$=—H, —CH$_3$; $R_2$=—H, —CH$_3$; $R_3$=—CH$_3$, —CH$_2$CH$_3$, —CH$_2$CH$_2$CH$_3$, —CH$_2$Ar, —CH$_2$CH$_2$Ar, —Ar, —CH$_2$CH$_2$CF$_3$, or —CH$_2$CH$_2$—R$_f$ with R$_f$ being a C$_1$ to C$_8$ perfluoroalkyl group; $R_4$=—CH$_3$, —CH$_2$CH$_3$, —CH$_2$CH$_2$CH$_3$, —CH$_2$CH$_2$CF$_3$, or —CH$_2$CH$_2$—R$_f$ with R$_f$ being a C$_1$ to C$_8$ perfluoroalkyl group; $R_5$=—CH$_3$, —CH$_2$CH$_3$, —CH$_2$Ar, —CH$_2$CH$_2$Ar, or —Ar; $R_6$=—H, —OH, —OCH$_3$, or —OCH$_2$CH$_3$; Ar is unsubstituted phenyl or phenyl substituted with one or more methyl, halogen, ethyl, trifluoromethyl, pentafluoromethyl, or —CH$_2$CF$_3$ groups; n, m, and k are integer numbers; n≥1 (for example, n≥2, 3, 4, or 5), m≥0 (for example, m≥1, 2, 3, 4, or 5), k≥0, with the proviso that when m=k=0, at least one, of R$_1$ and R$_2$ is —CH$_3$, for example, both of R$_1$ and R$_2$ are —CH$_3$, and wherein the hydrosiloxane agent has a number average molecular weight from 208 to about 20,000. The number average molecular weight and viscosity of the hydrosiloxane agent, the value of n, the sum of n, m, and k, and the proportion of n to the sum of n, m and k may be varied as described above. A reaction mixture comprising a solvent, silica particles dispersed in the solvent, and the hydrosiloxane agent is prepared. Where R$_6$ is —H, the solvent includes at least one of water, methanol, and ethanol. The reaction mixture is then dried to provide hydrophobic silica particles.

The hydrosiloxane agent may be prepared from a precursor having the formula

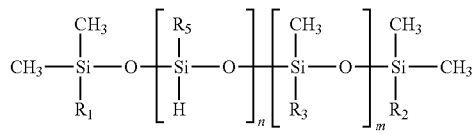

and for which the various R$_x$, n, m, and number average molecular weight are as described above (i.e., as for the hydrosiloxane agent where k=0 and R$_6$ is H). For example, a portion of the Si—H groups in the precursor may be reacted to substitute the at least a portion of the hydride with hydroxide, ethoxide, or methoxide to form the hydrosiloxane agent. Without being bound by any particular theory, it is believed that under both basic and acidic reaction conditions, the Si—H bond is cleaved by hydrolysis or alcoholysis (depending on the reaction media), with the hydride replaced with a hydroxyl group (from water) or ethoxy or methoxy groups (from the corresponding alcohol). The hydroxyl or alkoxy group then acts as a leaving group as the neighboring silicon atom reacts with the surface of the silica particles: Hydride groups from unreacted Si—H groups may also react directly with the particle surface. Thus, the hydrosiloxane agent may be attached to the surface of the silica particles without substantial cleavage of the siloxane backbone.

Alternatively or in addition, the precursor may be fluorinated at the same hydride groups by reaction with a fluorinated vinyl compound, preferably in the presence of a catalyst, for example, Karstedt catalyst. Other catalysts appropriate for the addition of olefins to Si—H groups are also known to those of skill in the art; appropriate catalysts are available from Gelest, Inc. (Morrisville, Pa.) and other sources. Exemplary vinyl compounds include any that would result in the fluorinated R$_4$ groups above.

Alternatively or in addition, other chemical groups may be introduced to the precursor via similar chemical reactions. For example, Ar groups as defined above, C$_1$-C$_3$ alkyl groups, or R$_f$ groups as defined above may be attached to the co-polymer backbone in this manner. Exemplary vinyl compounds that may be reacted with the copolymer include those that would result in the groups R$_4$ above.

The proportion of hydrosiloxane units that may be modified with fluorinated or other chemical groups may be adjusted to provide additional hydrophobicity or other properties to the hydrosiloxane agent using techniques available to those of skill in the art. In certain embodiments, from about 10% to about 90% of the hydride groups on the polymer, for example, about 15% to about 20%, about 20% to about 30%, about 30% to about 40%, about 40% to about 50%, about 50% to about 60%, about 60% to about 70%, about 70% to about 80%, or about 80% to about 90% of the hydride groups on the hydrosiloxane agent, are reacted with a vinyl compound.

A reaction mixture may be prepared by combining the hydrosiloxane agent, silica particles, and a solvent in any order. For example, the hydrosiloxane agent may be added to a dispersion of silica particles, to which additional aqueous or non-aqueous solvent may also be added. Alternatively, the hydrosiloxane agent may be dissolved in a solvent (which may be a mixture of solvents), and silica particles or a dispersion of silica particles may be added. The reaction mixture may include additional components, for example, to adjust the pH up or down.

In preferred embodiments, treatment of silica particles with hydrosiloxane agents including alkyl- and/or arylhydrosiloxane groups and dialkyl- and/or arylalkylsiloxane groups covalently attaches these polymers to the silica particles while still allowing the dialkyl- or arylalkylsiloxane groups to impart hydrophobicity to the particle. In contrast, prior art high-temperature PDMS treatments provide far less chemical attachment to the silica particle; a large proportion of the PDMS may be extracted by organic solvents, rendering the treatment less stable in non-aqueous media and leaving a higher proportion of hydrophilic hydroxyl groups on the surface. In addition, the hydrosiloxane agents described herein are far more soluble in aqueous media than dialkylsiloxane polymers, facilitating their reaction with dispersed silica particles, e.g., colloidal silica particles in aqueous media. This is especially so after hydrolysis or alcoholysis of the hydride group.

The silica particles may be provided as a commercially available dispersion of silica particles (e.g., a commercially available colloidal silica), several examples of which are disclosed above. Alternatively, the silica particles can be dispersed by any suitable method. For example, a dispersion of silica particles can be prepared by dispersing silica particles, e.g., precipitated or fumed silica, in water or alcohol, with or without additional co-solvent (including mixtures of water and alcohol), using a high-shear mixer.

The silica particles may be any of the silica particles described above. When colloidal silica particles are employed, the dispersion of silica particles preferably is colloidally stable. The colloidal stability of the dispersion prevents any substantial portion of the particles from irreversibly agglomerating or gelling, or from settling out of the dispersion during use. The dispersion of silica particles used in conjunction with the invention preferably has a degree of colloidal stability such that the average overall particle size of the silica particles in dispersion, as measured by dynamic light scattering, does not change over a period of 1 hour or more (e.g., about 8 hours or more, or about 24 hours or more), more preferably 2 weeks or more (e.g., about 4 weeks or more, or about 6 weeks or more), most preferably 8 weeks or more (e.g., about 10 weeks or more, or about 12 weeks or more), or even about even 16 weeks or more.

The reaction mixture can be acidic, i.e., can have a pH less than about 7, or basic, i.e., can have a pH greater than about 7.

The pH of the reaction mixture can be, for example, between 7 and about 12, for example, from about 8 to about 9, from about 9 to about 10, from about 10 to about 11, or from about 11 to about 12. Alternatively, the pH of the reaction mixture may be between 7 and about 1, for example, from about 6 to about 5, from about 5 to about 4, from about 4 to about 3, from about 3 to about 2, or from about 2 to about 1. The pH of the reaction mixture can be adjusted to desired levels, for example, by adding an acid or a base to the reaction mixture. Alternatively or in addition, where a dispersion of silica particles is used, the pH of the dispersion of silica particles may have or be adjusted to any of the above ranges.

The reaction mixture may include an organic solvent, e.g, the reaction mixture may include only organic solvent or a mixture of organic and aqueous solvents. If the reaction mixture also includes an aqueous solvent, the organic solvent preferably is water-soluble or water-miscible. More preferably, the organic solvent is water-soluble. The water-soluble organic solvent can be any suitable water-soluble organic solvent, such as an alcohol (e.g., methanol, ethanol, n-propanol, 2-propanol, n-butanol, isobutanol, sec-butanol, tert-butanol, n-propanol, ethylene glycol, and propylene glycol), ketone (e.g., acetone and 2-butanone), ether (e.g., tetrahydrofuran and 1,2-dimethoxyethane). Mixtures of two or more of any of these solvents may also be employed. Where the silica particles are provided in an aqueous dispersion, water and water-soluble organic solvent can be combined with a dispersion of silica particles in any order. For example, the water can be added before the water-soluble organic solvent, or vice versa. Desirably, the water is added first, to reduce the concentration of solids to a suitable amount before addition of the water-soluble organic solvent, especially when using a base-stabilized dispersion. Although not wishing to be bound by a particular theory, it is thought that adding the water before the water-soluble organic solvent prevents the dispersion from gelling.

When the solvent includes both aqueous and organic components, the organic solvent to water volume ratio can be any suitable ratio. The ratio may be less than about 10 (e.g., about 8 or less, about 6 or less, about 5 or less, about 3 or less, about 2 or less, or about 1 or less). The ratio can be about 0.05 or more (e.g., about 0.1 or more, about 0.5 or more, about 0.7 or more, about 1 or more, or about 1.2 or more), such as about 0.05 to about 10 (e.g., from about 0.1 to about 5, or from about 0.2 to about 2). For example, the ratio may be from about 0.05 to about 0.1, from about 0.1 to about 0.2, from about 0.2 to about 1, from about 1 to about 2, from about 2 to about 3, from about 3 to about 5, from about 5 to about 6, from about 6 to about 8, or from about 8 to about 10.

The reaction mixture can contain any suitable amount of silica particles. The reaction mixture typically comprises about 45 wt. % or less (e.g., about 35 wt. % or less, about 25 wt. % or less, about 15 wt. % or less, about 10 wt. % or less, or about 5 wt. % or less) silica particles. The reaction mixture can comprise about 5 wt. % or more (e.g., about 10 wt. % or more, about 15 wt. % or more, about 20 wt. % or more, about 25 wt. % or more, or about 30 wt. % or more) silica particles. Thus, the reaction mixture can comprise, for example, from about 5 wt. % to about 45 wt. % (e.g., from about 10 wt. % to about 45 wt. %, from about 15 wt. % to about 35 wt. %, or from about 15 wt. % to about 20 wt. %) silica particles.

The silica particles can be treated with a second treatment agent, including but not limited to an organosilane compound. For example, the second treatment agent may also provide hydrophobicity. Preferred hydrophobicity-imparting agents are silazane compounds, siloxane compounds, and silane compounds. Examples of silane compounds include alkylhalosilanes, alkylsilanes, and alkoxysilanes. Alkoxysilanes include compounds having the general formula: $R'_x Si(OR'')_{4-x}$ wherein $R'$ is selected from the group consisting of $C_1$-$C_{30}$ branched and straight chain alkyl, alkenyl, $C_3$-$C_{10}$ cycloalkyl, and $C_6$-$C_{10}$ aryl, $R''$ is $C_1$-$C_{10}$ branched or straight chain alkyl, and x is an integer of 1-3. Alkylhalosilanes include compounds having the general formula $R'_x SiR''_y Q_{4-x-y}$, where $R'$ and $R''$ are as defined above, Q is a halogen, preferably chlorine, and y is 1, 2, or 3.

Non-limiting examples of agents that may be employed as the second treatment agent as taught herein include trimethylsilane, trimethylchlorosilane, dimethyldichlorosilane, methyltrichlorosilane, allyldimethylchlorosilane, benzyldimethylchlorosilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-butyltrimethoxysilane, n-hexadecyltrimethoxysilane, n-octadecyltrimethoxysilane, vinyltrimethoxysilane, vinyltriethoxysilane, gamma-oxypropyltrimethoxysilane methacrylate, vinyltriacetoxysilane, and the like. Non-limiting examples of useful silazane compounds include hexamethyldisilazane (HMDZ), hexamethylcyclotrisilazane, octamethylcyclotetrasilazane, and the like. For example, HMDZ may be used to cap unreacted hydroxyl groups on the surface of the silica particle and unreacted silanol groups in the co-polymer. Non-limiting examples of useful siloxane compounds include octamethylcyclotetrasiloxane, hexamethylcyclotrisiloxane, and the like. Preferred hydrophobicity-imparting agents are hexamethyldisilazane, isobutylrimethoxysilane, octyltrimethoxysilane and cyclic silazanes such as those disclosed in U.S. Pat. No. 5,989,768. Such cyclic silazanes are represented by the formula

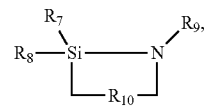

where wherein $R_7$ and $R_8$ are independently selected from the group consisting of: hydrogen, halogen, alkyl, alkoxy, aryl, and aryloxy; $R_9$ is selected from the group consisting of: hydrogen, $(CH_2)_r CH_3$, wherein r is an integer between 0 and 3, $C(O)(CH_2)_r CH_3$, wherein r is an integer between 0 and 3, $C(O)NH_2$; $C(O)NH(CH_2)_r CH_3$, wherein r is an integer between 0 and 3, and $C(O)N[(CH_2)_r CH_3](CH_2)_s CH_3$, wherein r and s are integers between 0 and 3; and $R_{10}$ is represented by the formula $[(CH_2)_a(CHX)_b(CYZ)_c]$, wherein X, Y and Z are independently selected from the group consisting of: hydrogen, halogen, alkyl, alkoxy, aryl, and aryloxy, and a, b, and c are integers between 0 and 6 satisfying the condition that (a+b+c) equals an integer between 2 and 6. More preferably, the cyclic silazane is a five or six member ring having the formula

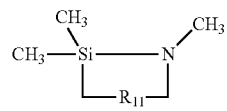

wherein $R_{11}$ is represented by the formula $[(CH_2)_a(CHX)_b(CYZ)_c]$, wherein X, Y and Z are independently selected from the group consisting of: hydrogen, halogen, alkyl, alkoxy, aryl, and aryloxy, and a, b, and c are integers between 0 and 6 satisfying the condition that (a+b+c) equals an integer between 3 and 4.

Alternatively or in addition, the second treatment agent may be a charge modifying agent. Any of the charge modifying agents disclosed in U.S. Patent Publication No. 2010/0009280, the contents of which are incorporated herein by reference, may be employed herein. Exemplary charge modifying agents include but are not limited to 3-(2,4-dinitrophenylamino) propyltriethoxsilane (DNPS), 3,5-dinitrobenzamido-n-propyltriethoxysilane, 3-(triethoxysilylpropyl)-p-nitrobenzamide (TESPNBA), pentafluorophenyltriethoxysilane (PFPTES), and 2-(4-chlorosulfonylphenyl)ethyltrimethoxysilane (CSPES). Charge modifying agents including nitro groups should be used to post-treat the silica particles after the co-polymer, as the hydride groups may reduce the nitro groups.

The silica particles may be treated with the hydrosiloxane agent before, after, or simultaneously with the second treatment agent. The organic solvent, when used, is preferably added to a dispersion of silica particles before or simultaneously with the hydrosiloxane agent. Preferably, the silica particles are treated with the hydrosiloxane agent, followed by optional treatment with the second treatment agent. Where colloidal silica is being treated, the reaction mixture typically will comprise no more than about 50 wt. % of organic solvent, and preferably will comprise not more than about 40 wt. % of organic solvent. However, precipitated, co-fumed, or fumed silica particles may be treated in an organic solvent or mixture of organic solvents including methanol, ethanol, or both.

The amount of the hydrosiloxane agent that is included in the reaction mixture can be any suitable amount. The amount of the hydrosiloxane agent is typically up to about 20 μmole/m$^2$ silica particles (e.g., up to about 15 μmole/m$^2$, up to about 10 μmole/m$^2$, up to about 5 μmole/m$^2$, up to about 1 μmole/m$^2$, or up to about 0.5 μmole/m$^2$). The amount of the hydrosiloxane agent can be about 0.1 μmole/m$^2$ silica particles or more (e.g., about 0.25 μmole/m$^2$ or more, about 0.5 μmole/m$^2$ or more, about 1 μmole/m$^2$ or more, about 1.5 μmole/m$^2$ or more, about 2 μmole/m$^2$ or more, or about 5 μmole/m$^2$ or more).

The amount of the second treatment agent that used to treat the silica particles can be any suitable amount. The amount of the second treatment agent is typically up to about 20 μmole/m$^2$ silica particles (e.g., up to about 15 μmole/m$^2$, up to about 10 μmole/m$^2$, up to about 5 μmole/m$^2$, up to about 1 μmole/m$^2$, or up to about 0.5 μmole/m$^2$). The amount of the second treatment agent can be about 0.1 μmole/m$^2$ silica particles or more (e.g., about 0.25 μmole/m$^2$ or more, about 0.5 μmole/m$^2$ or more, about 1 μmole/m$^2$ or more, about 1.5 μmole/m$^2$ or more, about 2 μmole/m$^2$ or more, or about 5 μmole/m$^2$ or more).

The reaction mixture can be maintained at any temperature and for a sufficient period of time to allow the hydrosiloxane agent and optional second treatment agent to react completely, or to any extent desired, with the dispersed silica particles (e.g., react with the silanol groups on the surface of silica particles). Generally, the reaction mixture is maintained at a temperature of about 50° C. to about 75° C. (e.g., about 50° C. to about 55° C., about 55° C. to about 60° C., about 60° C. to about 65° C., about 65° C. to about 70° C., or about 70° C. to about 75° C.), for about 30 minutes or longer (e.g., about 120 minutes or longer, about 180 minutes or longer, or about 240 minutes or longer). Longer reaction times (e.g., about 5 hours or longer, about 7 hours or longer, about 10 hours or longer, or about 20 hours or longer) may be required depending upon particular reaction conditions (e.g., temperature and concentration of reagents). For example, the reaction mixture may be maintained at the desired temperature for about 30 min. to about 60 min., about 60 min. to about 120 minutes, about 120 min. to about 180 min., about 180 min to about 240 min., about 2 hours to about 5 hours, about 5 hours to about 7 hours, about 7 hours to about 10 hours, about 10 hours to about 15 hours, or about 15 hours to about 20 hours. Higher temperatures than 75° C. may be used; however, the temperature should be lower than the boiling point of the solvent or any of its components.

The reaction mixture can be contained in an open or closed reactor. While the reaction mixture can be maintained in an atmosphere of air, oxygen can be excluded from the reaction atmosphere, in which event the reaction mixture can be maintained under an atmosphere consisting essentially of nitrogen, argon, or a mixture thereof.

The hydrosiloxane agent and/or second treatment agent can be combined with the silica particles in any suitable manner. A dispersion of silica particles can be combined with the hydrosiloxane agent to provide the reaction mixture, and the reaction mixture can be maintained at any temperature and for a sufficient time to allow the hydrosiloxane agent to react with the dispersed silica particles as described herein. The second treatment agent can then be added to the reaction mixture, and this combination may be maintained at any temperature and for a sufficient time, including the times and temperatures listed above for the reaction mixture, to allow the second treatment agent to react with the dispersed silica particles as described herein.

Alternatively, a dispersion of silica particles may be combined with the second treatment agent to pre-react the silica particles with the second treatment agent at any temperature and for a sufficient time to allow the second treatment agent to react with the dispersed silica particles as described herein. The second treatment agent may be allowed to react with the dispersed silica particles for any of the times and temperatures described above for the reaction mixture. According to this embodiment, the hydrosiloxane agent is subsequently added to the dispersion of pre-reacted silica particles to provide the reaction mixture.

In yet another alternative, the hydrosiloxane and second treatment agents can be combined simultaneously, or substantially simultaneously, with a dispersion of silica particles to provide a reaction mixture. For example, the hydrosiloxane and second treatment agents can be charged simultaneously, or stepwise, into a reaction vessel containing the dispersion of silica particles so that not more than 5 minutes (e.g., not more than 10 minutes, or not more than 30 minutes) elapses between addition of the hydrosiloxane and second treatment agents.

After treatment with the hydrosiloxane and optional second treatment agent, where there are unreacted $R_6$ groups tethered to the surface of the resulting hydrophobic silica particles may be further reacted to introduce additional functional groups on the surface. The same reactions as described above to remove the hydride group or to react hydroxy or alkoxy groups may be employed, as may any other appropriate chemical reaction known to those of skill in the art Following treatment with the hydrosiloxane agent and any other desired treatments, the hydrophobic silica particles preferably are isolated from the reaction mixture and dried. The hydrophobic silica particles can be dried after isolation from the reaction mixture, or directly from the reaction mixture, e.g., by evaporating the volatile components of the reaction mixture from the hydrophobic silica particles. Evaporation of the volatile components of the reaction mixture can be accomplished using any suitable techniques, e.g., heat and/or reduced atmospheric pressure. When heat is used, the hydrophobic silica particles can be heated to any suitable drying temperature, for example, by using an oven or other similar device, or by spray drying.

Spray drying involves spraying the reaction mixture, or some portion thereof, comprising the hydrophobic silica particles as a fine mist into a drying chamber, wherein the fine mist is contacted with hot air causing the evaporation of volatile components of the reaction mixture.

The drying temperature chosen will depend, at least in part, on the specific components of the reaction mixture that require evaporation. Typically, the drying temperature will be about 40° C. or higher (e.g., about 50° C. or higher) such as about 70° C. or higher (e.g., about 80° C. or higher) or even about 120° C. or higher (e.g., about 130° C. or higher). Thus, the drying temperatures fall generally within the range of about 40° C. to about 250° C. (e.g., about 50° C. to about 200° C.), such as about 60° C. to about 200° C. (e.g., about 70° C. to about 175° C.), or about 80° C. to about 150° C. (e.g., about 90° C. to about 130° C.).

The hydrophobic silica particles can be dried at any pressure that will provide a useful rate of evaporation. When drying temperatures of about 120° C. and higher (e.g., about 120° C. to about 150° C.) are used, drying pressures of about 125 kPa or less (e.g., about 75 kPa to about 125 kPa) are suitable. At drying temperatures lower than about 120° C. (e.g., about 40° C. to about 120° C.), drying pressures of about 100 kPa or less (e.g., about 75 kPa or less) are useful. Of course, reduced pressure (e.g., pressures of about 100 kPa or less, 75 kPa or less, or even 50 kPa or less) can be used as a sole method for evaporating the volatile components of the reaction mixture.

Alternatively, the hydrophobic silica particles can be dried by lyophilization, wherein the liquid components of the reaction mixture are converted to a solid phase (i.e., frozen) and then to a gas phase by the application of a vacuum. For example, the reaction mixture comprising the hydrophobic silica particles can be brought to a suitable temperature (e.g., about −20° C. or less, or about −10° C. or less, or even −5° C. or less) to freeze the liquid components of the reaction mixture, and a vacuum can be applied to evaporate those components of the reaction mixture to provide dry hydrophobic silica particles.

The hydrophobic silica particles can be washed prior to or after isolation and/or drying from the reaction mixture. Washing the treated silica particles can be performed using a suitable washing solvent, such as water, a water-miscible organic solvent, a water-immiscible solvent, or a mixture thereof. The washing solvent can be added to the reaction mixture and the resulting mixture suitably mixed, followed by filtration, centrifugation, or drying to isolate the washed treated silica particles. Alternatively, the treated silica particles can be isolated from the reaction mixture prior to washing. The washed, treated silica particles can be further washed with additional washing steps followed by additional filtration, centrifugation, and/or drying steps.

The hydrophobic silica particles have a particle size that is dependent, at least in part, on the starting particle size of the silica particles dispersed in the reaction mixture. Preferred average particle sizes of the hydrophobic silica particles prepared in accordance with the method of the invention are as described with respect to the treated silica particles of the invention. Desirably, the average particle size of the hydrophobic particles prepared in accordance with the method of the invention is within about 50%, preferably within about 30% (e.g., within about 20%, about 15%, about 10%, or even about 5%) of the average particle size of the silica particles dispersed in solvent before reaction with the hydrosiloxane agent or optional second treatment agent.

The hydrophobic silica particle may be further physically processed after drying. Suitable processes include but are not limited to wet or dry grinding, hammer milling, and jet milling.

The $^{29}$Si NMR spectra of surface treated silica particles exhibit signal patterns in several well separated regions. As discussed herein, NMR spectra were acquired using a Bruker Avance II NMR spectrometer with $^{1}$H resonance frequency at 400.13 MHz, and $^{29}$Si resonance frequency at 79.49 MHz, respectively. A 4-mm double resonance magic angle spinning (MAS) solid-state NMR probe was used. To selectively detect the silicon-containing groups attached on the surface, the cross polarization (CP) and magic angle spinning (CP/MAS) were used for detecting $^{29}$Si NMR signals of the treated oxides. Typically, a magic angle spinning rate of 8000 Hz and a CP contact time of 10 ms were used. For enhancing the sensitivity of the NMR measurements, 20 full echoes of the NMR signals synchronized with MAS were generated using a train of refocusing RF pulses, called Carr-Purcell-Meiboom-Gill (CPMG) sequence. The combination of CP/MAS and CPMG techniques, called here as CP/CPMG/MAS, gives a signal enhancement of over a factor of 6, which makes it possible to obtain good $^{29}$Si NMR signals in a relatively short time. Typically, the NMR measurements were performed with the duration between the refocusing pulses of 6.5 ms, a recycle delay of 3 s, and the number of scans between 1000 and 4000. The $^{1}$H and $^{29}$Si NMR chemical shifts in ppm were referenced to the tetramethylsilane standard.

The signal patterns in the NMR spectra are due to the presence of various surface siloxane functional groups, commonly referred as M, D, T and Q structural units. The M, D, T, and Q notations refer to the number of oxygen atoms bonded to the silicon as monooxo, dioxo, trioxo, and quaternary, respectively, as shown in FIG. 1, where R is an alkyl group.

The $^{29}$Si NMR signals of the M, D, T and Q units appear in the well-separated regions with chemical shifts between 2 and 20 ppm, between 0 and −25 ppm, between −40 and −70 ppm, and between −75 and −130 ppm, respectively, when the alkyl groups is a saturated aliphatic group, such as a methyl group. In addition, when one of the R group of the D unit is replaced by hydrogen (i.e. an alkylsiloxyl hydride group), the $^{29}$Si NMR signals appears in another well-resolved region (denoted as H) between −30 and −40 ppm. Therefore, the $^{29}$Si NMR is a very powerful analytical technique for characterizing the surface treatment of silicas with siloxane based polymers and copolymers, including hydrosiloxane copolymers. The distribution of various attached alkylsiloxyl groups (e.g., M, D, T, and H) can be determined from the distributions of $^{29}$Si NMR signals over well-resolved spectral regions. The surface silanol groups can also be determined from the distribution of the $^{29}$Si NMR signals within the Q region.

As shown in Comparative Example 2, due to hydrolysis of the hydromethylsiloxane units in the hydrosiloxane copolymer, much higher amounts of the T units were attached to silica particles treated with a hydrosiloxane agent than to silica particles treated with PDMS.

In addition, the high number of T groups indicate that multiple siloxyl groups on a single copolymer chain were attached to the surface; in contrast, typically only one (linear) or two groups (loop) of a single PDMS homopolymer chain were attached to the surface. Consequently, the morphology of attached polymer chains on silica particles treated with the hydrosiloxane agent is also very unique. A much higher percentage of the material attached to the silica particles treated with the hydrosiloxane agent is composed of short loops than for PDMS treated silica particles. These short loops on the copolymer treated silica render the attached polymer less mobile than tethered PDMS oligomers.

The hydrophobic silica particles can be formulated as a dry particle composition (e.g., a dry powder) or as a wet particle composition (e.g., dispersion) comprising the hydrophobic silica particles. The dispersion can comprise any suitable dispersant, preferably water alone or with a co-solvent, treating agents, or additives of any type commonly used in dispersions of hydrophobic silica particles.

The hydrophobic silica particles are especially useful in toner compositions. In one embodiment, the toner composition, includes toner particles and the reaction product of silica particles and at least a hydrosiloxane agent represented by the following formula

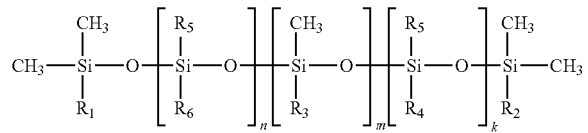

wherein $R_1$=—H, —$CH_3$; $R_2$=—H, —$CH_3$; $R_3$=—$CH_3$, —$CH_2CH_3$, —$CH_2CH_2CH_3$, —$CH_2Ar$, —$CH_2CH_2Ar$, —Ar, —$CH_2CH_2CF_3$, or —$CH_2CH_2$—$R_f$ with $R_f$ being a $C_1$ to $C_8$ perfluoroalkyl group; $R_4$=—$CH_3$, —$CH_2CH_3$, —$CH_2CH_2CH_3$, —$CH_2CH_2CF_3$, or —$CH_2CH_2$—$R_f$ with $R_f$ being a $C_1$ to $C_8$ perfluoroalkyl group; $R_5$=—$CH_3$, —$CH_2CH_3$, —$CH_2Ar$, —$CH_2CH_2Ar$, or —Ar; $R_6$=—H, —OH, —$OCH_3$, or —$OCH_2CH_3$; Ar is unsubstituted phenyl or phenyl substituted with one or more methyl, halogen, ethyl, trifluoromethyl, pentafluoromethyl, or —$CH_2CF_3$ groups; n, m, and k are integer numbers; n≥1 (for example, n≥2, 3, 4, or 5), m≥0 (for example, m≥1, 2, 3, 4, or 5), k≥0, with the proviso that when m=k=0, at least one, of $R_1$ and $R_2$ is —$CH_3$, for example, both of $R_1$ and $R_2$ are —$CH_3$, and wherein the hydrosiloxane agent has a number average molecular weight from 208 to about 20,000. The number average molecular weight and viscosity of the hydrosiloxane agent, the value of n, the sum of n, m, and k, and the proportion of n to the sum of n, m and k may be varied as described above.

The toner particles can be any suitable toner particles. Suitable toner particles typically comprise a colorant and a binder resin.

The colorant can be any suitable colorant. A wide range of colored pigments, dyes, or combinations of pigments and dyes can be used as the colorant. The colorant can be blue, brown, black such as carbon black, cyan, green, violet, magenta, red, yellow, as well as mixtures thereof. Suitable classes of colored pigments and dyes include, for example, anthraquinones, phthalocyanine blues, phthalocyanine greens, diazos, monoazos, pyranthrones, perylenes, heterocyclic yellows, quinacridones, and (thio)indigoids. The colorant can be present in any suitable amount, e.g., an amount sufficient to provide the desired color to the toner composition. Generally, the colorant is present in an amount of about 1% by weight to about 30% by weight of the toner composition; however, lesser or greater amounts of the colorant can be utilized.

The binder resin can be any suitable binder resin. Illustrative examples of suitable binder resins include homopolymers and copolymers of polyesters, polyamides, polyolefins, styrene acrylates, styrene methacrylates, styrene butadienes, crosslinked styrene polymers, epoxies, polyurethanes, vinyl resins, including homopolymers or copolymers of two or more vinyl monomers, polyesters, and mixtures thereof. In particular, the binder resin can include (a) homopolymers of styrene and its derivatives and copolymers thereof such as polystyrene, poly-p-chlorostyrene, polyvinyltoluene, styrene p-chlorostyrene copolymer, and styrene vinyltoluene copolymer, (b) copolymers of styrene and acrylic acid ester such as styrenemethyl acrylate copolymer, styrene ethyl acrylate copolymer, styrene-n-butyl acrylate copolymer, and styrene-2-ethylhexyl acrylate copolymer, (c) copolymers of styrene and methacrylic acid ester such as styrene methyl methacrylate, styrene ethyl methacrylate, styrene n-butyl methacrylate, and styrene 2-ethylhexyl methacrylate, (d) multi-component copolymers of styrene, acrylic acid ester, and methacrylic acid ester, (e) styrene copolymers of styrene with other vinyl monomers such as acrylonitrile, vinyl methyl ether, butadiene, vinyl methyl ketone, acrylonitrile-indene, and maleic acid ester, (f) polymethyl methacrylate, polybutyl methacrylate, polyvinyl acetate, polyvinyl butyral, polyacrylic acid resin, phenolic resin, aliphatic or alicyclic hydrocarbon resin, petroleum resin, and chlorin paraffin, and (g) mixtures thereof. Other types of suitable binder resins are known to those skilled in the art. The binder resin can be present in any suitable amount, typically about 60 wt. % to about 95 wt. % (e.g., about 65 wt. % to about 90 wt. %, or about 70 wt. % or about 85 wt. %) of the toner composition.

The surface-treated silica particles can be present in any suitable amount in the toner composition. The surface-treated silica particles can be present in an amount of about 0.01 wt. % or more (e.g., about 0.05 wt. % or more, about 0.1 wt. % or more, about 0.5 wt. % or more, about 1 wt. % or more, about 2 wt. % or more, about 3 wt. % or more, about 4 wt. % or more, or about 5 wt. % or more) based on the total weight of the toner composition. In addition, the surface-treated silica particles can be present in an amount of about 10 wt. % or less (e.g., about 8 wt. % or less, about 6 wt. % or less, about 5 wt. % or less, or about 4 wt. % or less) based on the total weight of the toner composition. For example, the surface-treated silica particles can be present in an amount of about 0.01 wt. % to about 10 wt. % (e.g., about 0.1 wt. % to about 8 wt. %, or about 0.5 wt. % or about 5 wt. %) based on the total weight of the toner composition.

Optional additives can be present in the toner composition, such as, for example, magnetic material; carrier additives; positive or negative charge controlling agents such as quaternary ammonium salts, pyridinum salts, sulfates, phosphates, and carboxylates; flow aid additives; silicone oils; waxes such as commercially available polypropylenes and polyethylenes; and other known additives. Generally, these additives are present in an amount of about 0.05 wt. % to about 30 wt. % (e.g., about 0.1 wt. % to about 25 wt. %, or about 1 wt. % to about 20 wt. %) of the toner composition; however, lesser or greater amounts of the additives can be utilized depending on the particular system and desired properties.

Conventional equipment for dry blending of powders can be used for mixing or blending the surface-treated silica particles with toner particles to form a toner composition.

The toner composition can be prepared by a number of known methods, such as admixing and heating the surface-treated silica particles, the colorants, the binder resin, and optional charge-enhancing additives and other additives in conventional toner extrusion devices and related equipment. Other methods include spray drying, melt dispersion, extrusion processing, dispersion polymerization, and suspension polymerization, optionally followed by mechanical attrition and classification to provide toner particles having a desired average size and a desired particle size distribution.

The toner composition can be used alone in mono-component developers or can be mixed with suitable dual-component developers. The carrier vehicles which can be used to form developer compositions can be selected from various materials. Such materials typically include carrier core particles and core particles overcoated with a thin layer of film-forming resin to help establish the correct triboelectric relationship and charge level with the toner employed. Suitable carriers for two-component toner compositions include iron powder, ferrite powder, and nickel powder, all of which are typically coated with a resin coating such as an epoxy or fluorocarbon resin, and any other carrier known to those of skill in the art.

The tribocharge of toner compositions containing the treated silica particles can be either positive or negative. The tribocharge of a toner composition containing the inventive treated silica particles is affected by the presence of the treated particles. Without wishing to be bound by a particular theory, it is thought that the presence of the treated silica particles stabilizes and increases the positive or negative tribocharge of toner compositions containing the silica particles.

Toner compositions containing the treated silica particles can be formulated, for example, by mixing 4 wt. % of the treated particles in a laboratory blender with pulverized styrene acrylate toner particles free of any external additives and having an average diameter of 9 μm. Toner compositions containing the treated particles can be developed, for example, by rolling for 30 minutes at a 2/98 wt. % toner/carrier ratio in glass jars. The carrier can be 70 μm Cu—Zn ferrite coated with silicone resin. Samples can be conditioned in a standard humidity chamber at either a high humidity and high temperature (30° C. and 80% relative humidity) or at a low humidity and low temperature (18° C. and 15% relative humidity) overnight.

The tribocharge of toner compositions containing the treated silica particles can be either positive or negative. Tribocharge measurements can be made using suitable techniques and equipment known in the art (e.g., Vertex T-150 tribocharger). Measurements can be made after conditioning the toner particles (e.g., of a toner composition comprising about 4 wt. % treated silica particles) overnight in a standard humidity chamber at 30° C. and 80% relative humidity (HH) and at 18° C. and 15% relative humidity (LL).

The present invention will be further clarified by the following examples which are intended to be only exemplary in nature.

EXAMPLES

Example 1

Samples #1-3, Treatment of Colloidal Silica ST-OL with methylhydrosiloxane.dimethylsiloxane Copolymer at Basic pH 260 g of colloidal silica dispersion (ST-OL, 20.8 wt % silica, pH=~2.5, surface area approximately 60 m$^2$/g, manufactured by Nissan Chemical) was charged into a 500 mL three-neck round bottom flask equipped with a condenser, nitrogen purge inlet, an overhead stirring motor, and a thermocouple. The stirring motor was set at approximately 200 rpm and stirring and slow purging with $N_2$ continued through the treatment. The pH of the dispersion was adjusted to 10.5 using concentrated ammonium hydroxide ($NH_4OH$) solution in water, after which 164 g (208 mL) of isopropanol and the desired amount of methylhydrosiloxane-dimethylsiloxane co-polymer (CAS#68037-59-2, Mn=900-1200, viscosity 25-35 cSt, mole % of [Me(H)SiO] 50-55%; amount of co-polymer indicated in Table 1) were slowly added to the dispersion. The temperature of the reaction mixture was increased to 70° C. and the reaction was allowed to proceed for 6 h, after which the slurry was transferred into a Pyrex tray and left to dry in a forced air oven at 110° C. overnight. The resulting dry powder of white color was ground using a laboratory grinder or jet milled. The final product was tested for carbon content. A sample of each dried product was extracted with toluene for 3 hours and then dried under vacuum at 90-100° C. for 18 hours and subsequently tested for carbon content in a LECO-C200 analyzer (LECO Corporation, St. Joseph, Mo.) according to the manufacturer's instructions.

The copolymer loadings used during the synthesis and results of carbon content measurements for Samples 1-3 before and after extraction with toluene are shown in Table 1. The level of copolymer attachment was calculated using a copolymer Mw of 2333 g/mol, as measured by gel permeation chromatography and carbon content of 27 wt %, as measured using the LECO-C200.

TABLE 1

| Sample # | Copolymer loading (g) | % C before extraction | % C after extraction with toluene | Copolymer attachment level (μmol/m$^2$) |
|---|---|---|---|---|
| 1 | 11.4 | 3.89 | 1.22 | 0.32 |
| 2 | 9.7 | 2.97 | 1.11 | 0.29 |
| 3 | 8.0 | 2.50 | 1.06 | 0.28 |

Example 2

Sample #4, Treatment of Colloidal Silica with methylhydrosiloxane.dimethylsiloxane Copolymer at Acidic pH Colloidal silica (ST-OL, available from Nissan Chemical, as received pH ~2.5) was treated in the same matter as Sample 1, except that the pH of the colloidal silica slurry was not adjusted with ammonium hydroxide. The loading of the methylhydrosiloxane-dimethylsiloxane co-polymer loading was 11.4 g. The carbon content in the final product was 3.29 wt % before extraction and 1.33 wt % after the extraction with toluene. The post-extraction carbon content corresponds to a copolymer attachment level of 0.35 μmol/m$^2$.

Example 3

Sample #5, Treatment of Colloidal Silica PL-10H with methylhydrosiloxane.dimethylsiloxane Copolymer at Basic pH 200 g of colloidal silica dispersion (PL-10H, 24 wt % silica, pH=7, surface area approximately 30 m$^2$/g, manufactured by Fuso Chemical) was charged into a 500 mL three-neck round bottom flask equipped with a condenser, nitrogen purge inlet, an overhead stirring motor, and a thermocouple. The stirring motor was set at 200 rpm and stirring and slow purging with $N_2$ continued through the treatment. 10.5 mL of 9.5 M ammonium hydroxide solution in water, 65 g of isopropanol, 25 g of ethanol, and 2.7 g of methylhydrosiloxane-dimethylsiloxane co-polymer (CAS#68037-59-2, Mn=900-1200, viscosity 25-35 cSt, mole % of [Me(H)SiO] is 50-55%)

were slowly added to the dispersion. The temperature was raised to 70° C. and the mixture allowed to react for 6.5 h, after which the mixture was transferred into a Pyrex tray and left to dry in a forced air oven at 110° C. for 17 h. The carbon content in the final product was 1.17 wt % before extraction and 0.91 wt % after the extraction with toluene. The post-extraction carbon content corresponds to a copolymer attachment level of 0.48 μmol/m².

Example 4

Sample #6, Treatment of Colloidal Silica PL-10H with Pre-yydrolyzed PDMS Copolymer at Basic pH 235 g of isopropanol, 100 g of ethanol, and 12.0 mL of 9.5 M aqueous solution of ammonium hydroxide were charged into a three-neck round bottom flask equipped with a condenser, nitrogen purge inlet, an overhead stirring motor, and a thermocouple. 10.8 g of methylhydrosiloxane-dimethylsiloxane co-polymer (CAS#68037-59-2, Mn=900-1200, viscosity 25-35 cSt, mole % of [Me(H)SiO] is 50-55%) was slowly added to the solution, and the temperature was increased to 70° C. The mixture was allowed to react for 24 h.

400 g of colloidal silica dispersion (PL-10H, 24 wt % silica, pH=7, surface area approximately 30 m²/g, manufactured by Fuso Chemical) was charged into a separate three-neck round bottom flask equipped with a condenser, nitrogen purge inlet, an overhead stirring motor, and a thermocouple. The contents of the first flask were added to this dispersion, and an additional 5.0 mL of ammonium hydroxide solution was added. The combined mixture was allowed to react for 23 h, after which it was transferred into a Pyrex tray and dried in a forced air oven at 110° C. for 17 h. The carbon content in the final product was 1.15 wt % before extraction and 0.90 wt % after the extraction with toluene.

Example 5

Samples #7-10, Treatment of Colloidal Silica with methylhydrosiloxane.dimethylsiloxane Copolymer and HMDZ Colloidal silica (ST-OL, available from Nissan Chemical) was treated in the same matter as Sample 1 through the addition of the hydrosiloxane copolymer. After copolymer addition, the mixture allowed to react for 4 h at 70° C., following which 12.5 g of HMDZ was added. The reaction was allowed to proceed an additional four hours, after which the slurry was transferred into a Pyrex tray and dried in a forced air oven at 110° C. overnight.

Four samples were prepared following the described treatment protocol. The copolymer loadings used during the synthesis, HMDZ loading, and the results of carbon content measurements for treated silicas before and after extraction with toluene are shown in Table 2.

TABLE 2

| Sample # | Copolymer loading (g) | HMDZ loading (g) | % C before extraction | % C after extraction with toluene |
|---|---|---|---|---|
| 7 | 2.9 | 12.5 | 1.00 | 0.71 |
| 8 | 5.7 | 12.5 | 1.89 | 0.88 |
| 9 | 8.6 | 12.5 | 2.68 | 1.04 |
| 10 | 11.4 | 12.5 | 3.52 | 1.17 |

Example 6

Sample #11-14, Treatment of Colloidal Silica with a Cyclic Silazane, methylhydrosiloxane.dimethylsiloxane Copolymer, and HMDZ 309 g isopropanol, 129 g ethanol, and 10.0 mL of a 14.8 N aqueous solution of ammonium hydroxide were charged into a 500 mL three-neck round bottom flask fitted with a condenser, overhead stirrer, and a thermocouple. The desired amount of methylhydrosiloxane-dimethylsiloxane copolymer (CAS#68037-59-2, Mn=900-1200, viscosity 10-15 cSt, mole % of [Me(H)SiO] is 50-55%, amount of co-polymer indicated in Table 3) was added to the solution. The temperature was adjusted to 70° C. and the mixture reacted for a 24 h period with 250 rpm stirring.

1000 g of colloidal silica dispersion (ST-OL, 20.8 wt % silica, pH 2.5, surface area approximately 60 m2/g, manufactured by Nissan Chemical) was added to a 2 L three-neck round bottom flask fitted with a condenser, overhead stirrer, and a thermocouple. 4.8 g of N-methyl-aza-2,2,4-trimethyl-sila-cyclopentane (CAS#18387-19-4) was added to the silica dispersion with approximately 100 mL isopropanol to prevent foaming. The mixture was heated to 70° C. and reacted 1.5 h with 150 rpm stirring. The contents of the first flask, containing the prehydrolyzed methylhydrosiloxane-dimethylsiloxane copolymer, were then added to the silica dispersion. The mixture was reacted at 70° C. for approximately 5 h, with 200 rpm stirring. 64.19 g HMDZ was added, and the mixture was reacted for an additional 6 hours at 70° C. and then stirred at room temperature for approximately 10 h. The contents of the flask were transferred to a Pyrex tray and dried in a forced air oven at 110° C. for 24 h.

TABLE 3

| Sample # | Copolymer loading (g) | Cyclic loading (g) | HMDZ loading (g) | % C before extraction | % C after extraction with toluene |
|---|---|---|---|---|---|
| 11 | 3.14 | 4.78 | 64.19 | 1.07 | 0.94 |
| 12 | 6.30 | 4.78 | 64.19 | 1.16 | 1.02 |
| 13 | 12.56 | 4.78 | 64.19 | 1.83 | 1.44 |
| 14 | 20.93 | 4.78 | 64.19 | 2.26 | 1.85 |

Example 7

Step 1. Modification of methylhydrosiloxane-dimethylsiloxane copolymer with Zonyl PFBE fluorotelomer intermediate (CAS#19430-93-4, Mw=246.1, chemical formula $CF_3—CF_2—CF_2—CH=CH_2$).

The reaction was conducted under a nitrogen blanket. 50 mL of toluene was charged into a 100 mL three-neck round bottom flask fitted with a condenser, thermocouple, and nitrogen inlet. 20 g of methylhydrosiloxane-dimethylsiloxane copolymer, 0.05 mL (5 mmol) of Karstedt catalyst (CAS#68487-92-2, available from Gelest, Inc.), and 7.81 g (31.8 mmol) of Zonyl PFBE intermediate (Sigma-Aldrich Co., Milwaukee, Wis.) were added into the flask sequentially. The reaction temperature was raised to 90° C., and the mixture was allowed to react overnight, during which the mixture was constantly stirred using a magnetic stirrer. The next day, the toluene was removed on a rotary evaporator, and the $^1$H and $^{29}$Si NMR spectra of the product were recorded.

Analysis of the spectra indicated that ~20% of [Me(H)SiO] units reacted with the Zonyl PFBE intermediate, ~30% of

[Me(H)SiO] units cross linked (the copolymer formed loops), and ~50% of [Me(H)SiO] remained unreacted.

Step 2. Treatment of PL-10H colloidal silica with modified copolymer.

167 g of PL-10H colloidal silica dispersion (PL-10H, 24 wt % silica, pH=7, surface area approximately 30 m²/g, manufactured by Fuso Chemical) and 4.61 g of the modified copolymer from Step 1, which was dissolved in 127 mL of 2-propanol, were charged into a 1 L three-neck round bottom flask fitted with a condenser, thermocouple, and an overhead stirrer. The pH of the mixture was brought to 10 using ammonium hydroxide solution in water. The reaction temperature was raised to 70° C. and the reaction allowed to proceed for 8 hours, after which the mixture was transferred into a Pyrex tray and dried in a forced air oven at 120° C. overnight. The resulting white solid was milled with a laboratory grinder. The carbon content data for the final product are shown in Table 4.

TABLE 4

| Sample # | % C before extraction | % C after extraction with toluene |
|---|---|---|
| 15 | 3.68 | 2.82 |

Example 8

Water Adsorption Isotherms

Figure 2:
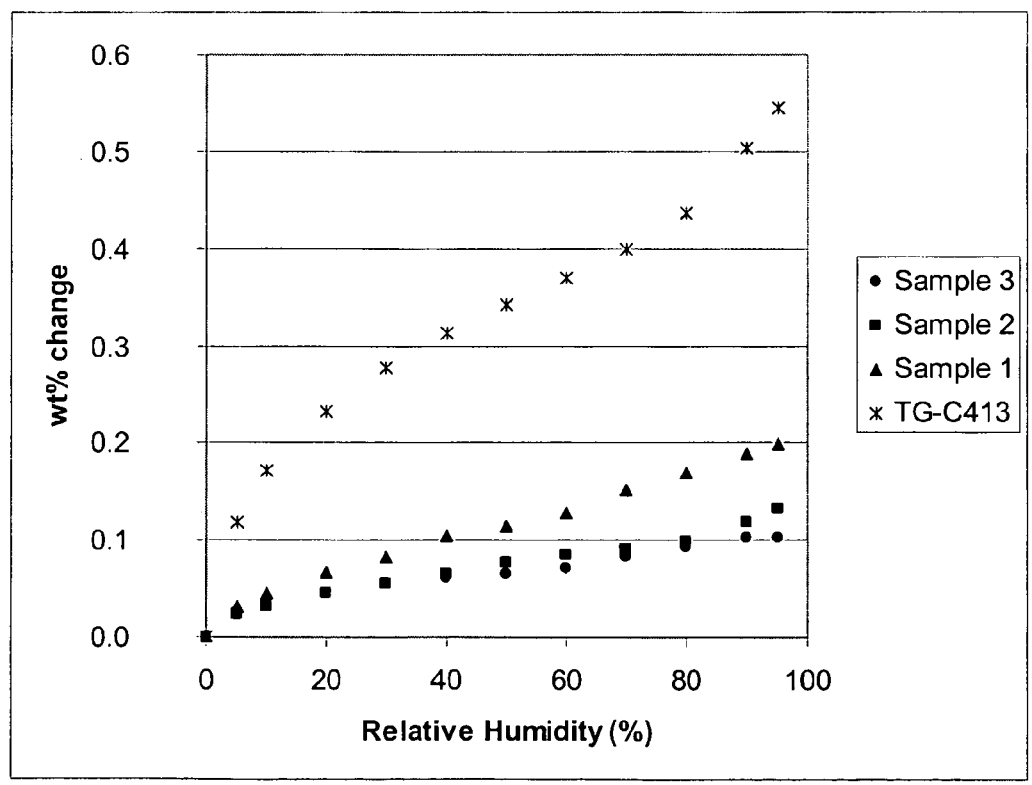
FIG. 2 is a graph comparing the water adsorption isotherms of various treated colloidal silicas according to exemplary embodiments of the invention to that of a commercially available product.

Water adsorption isotherms for treated colloidal silica Samples #1-3 and Cab-O-Sil™ TG-C413, an HMDZ treated colloidal silica available from Cabot Corporation, were measured at 25° C. using a dynamic vapor sorption balance from Surface Measurement Systems, Inc. 100 mg samples were dried in a glass vial in an oven at 125° C. for 30 min before the analysis. The dried samples were loaded into the instrument immediately after briefly holding them under the Haug One-Point-Ionizer (Haug North America, Williamsville, N.Y.). Data were collected every 20 min at relative humidity values between 0 and 95%. The results are shown in FIG. 2. The data demonstrate that samples treated with siloxane co-polymer adsorb 2-4 times less water than the HMDZ-treated colloidal material.

Example 9

Toner Preparation and Tribocharge Measurement

Toner was prepared by mixing 50 g polyester toner (Sinonar, TW) and 4 wt % additive, representing Samples #1-3 and 7-10 using a kitchen blender. To avoid overheating the toner, the blender was pulsed at 5 s intervals for 3 minutes. After blending, the toner-additive mixture was rolled an additional one hour. The toner was added to a carrier, 75 micrometer silicone-coated Cu—Zn ferrite particles, at 2 wt % loading. The carrier-toner mixtures were placed in glass jars and put in a humidity chamber for conditioning. HH conditioning was performed at 30° C. and 80% relative humidity; LL conditioning was performed at 18° C. and 15% relative humidity. After conditioning, the glass jar containing the sample was closed with a plastic cap. The toner was developed by rolling the jar on a roll mill at 185 RPM for 30 min; the jar was then removed from the roller and a sample removed and immediately tested for tribocharge. The results are shown in Tables 5 and 6 (Esd=estimated standard deviation).

TABLE 5

| Sample | HH (µC/g) | Esd HH | LL (µC/g) | Esd LL | HH/LL |
|---|---|---|---|---|---|
| 1 | −43 | 0.9 | −73 | 1.3 | 0.59 |
| 2 | −36 | 1.0 | −62 | 1.2 | 0.58 |
| 3 | −31 | 0.8 | −60 | 1.0 | 0.52 |
| TG-C413 | −32 | 1.8 | −70 | 1.5 | 0.46 |

TABLE 6

| Sample | HH (µC/g) | Esd HH | LL (µC/g) | Esd LL | HH/LL |
|---|---|---|---|---|---|
| 7 | −44 | 2.7 | −79 | 2.3 | 0.56 |
| 8 | −39 | 2.2 | −71 | 2.7 | 0.55 |
| 9 | −36 | 0.8 | −62 | 2.9 | 0.58 |
| 10 | −31 | 1.3 | −58 | 1.7 | 0.53 |
| TG-C413 | −31 | 0.5 | −70 | 3.0 | 0.44 |

The tribocharge data presented in Table 5 and Table 6 demonstrate that the treatment with the siloxane co-polymer affords materials with charging properties similar to that of HMDZ treated silica, which is widely used in toner formulations. The decrease of triboelectrostatic charge at HH conditions (i.e., the tribocharge becomes less negative) observed for samples #1-#3 and #7-#10 parallels the decrease in copolymer loading. A small improvement in tribocharge humidity sensitivity (increase in HH/LL ratio) is observed for materials with the higher copolymer loadings. Post-treatment with HMDZ does not affect the tribocharge performance significantly.

Example 10

Treatment of Silica Dispersion with a Cyclic Silazane, methylhydrosiloxane-dimethylsiloxane Copolymer, and HMDZ 200 g of isopropanol, 126 g of ethanol, and 10.0 mL of ammonium hydroxide were charged into a three-neck round bottom flask equipped with a condenser, nitrogen purge inlet, an overhead stirring motor, and a thermocouple. 5.83 g of methylhydrosiloxane-dimethylsiloxane co-polymer (CAS#68037-59-2, Mn=900-1200, viscosity 10-15 cSt, mole % of [Me(H)SiO] is 50-55%), was slowly added to the solution, and the temperature was increased to 70° C. The mixture was allowed to react for 24 h.

1650 g of Cab-O-Sperse™ dispersion (Cab-O-Sperse™ 1015 A, based on Cab-O-Sil® L-90 fumed silica, 15 wt % silica, pH=5), 200 g of isopropanol, and 8.8 g of N-methyl-aza-2,2,4-trimethylsila-cyclopentane (CAS#18387-19-4) were charged into a separate three-neck round bottom flask equipped with a condenser, nitrogen purge inlet, an overhead stirring motor, and a thermocouple. The mixture was heated to 70° C. and stirred for 2 hours at 200 rpm, after which the contents of the first flask were added to this dispersion. The resultant mixture was stirred at 200 rpm 4-5 h at 70° C., after which 119 g hexamethyldisilazane was added. The final mixture stirred at 70° C. for 6 h, then cooled to room temperature and stirred an additional 12 h. The dispersion was transferred to a Pyrex dish and dried for 24 h in a forced air oven at 120° C. The carbon content in the final product was 2.42 wt % before extraction and 2.06 wt % after the extraction with toluene.

Comparative Example 1

Sample 16—Treatment of Colloidal Silica with PDMS 260 g of colloidal silica dispersion (ST-OL, 20.8 wt % silica, pH 2.5, surface area approximately 60 m²/g, manufactured by Nissan Chemical) was charged into a 500 mL three-neck round-bottom flask equipped with a condenser, nitrogen purge inlet, an overhead stirring motor, and a thermocouple. The stirring motor was set at approximately 200 rpm. Stirring and slow purging of the reaction apparatus with $N_2$ continued through the treatment. The pH of the dispersion was adjusted to 10.5 using concentrated ammonium hydroxide ($NH_4OH$) solution in water, after which 164 g (208 mL) of isopropanol and 11.4 g of dimethylsiloxane polymer (CAS#9016-00-6, Mn=1250, viscosity 10 cSt) were slowly added. The temperature of the reaction mixture was increased to 70° C., and the reaction was allowed to proceed for 6 h, after which the slurry was transferred into a Pyrex tray and left to dry in a forced air oven at 110° C. overnight. The resulting dry powder had a white color and was ground using laboratory grinder.

The copolymer loading used during the synthesis and results of carbon content measurements for treated silicas before and after extraction with toluene are shown in Table 7. The same values for Sample #1 (Example 1) are shown for comparison.

TABLE 7

| Sample # | Polymer or copolymer loading (g) | % C before extraction | % C after extraction with toluene |
|---|---|---|---|
| 16 | 11.4 (polymer) | 4.70 | 0.75 |
| 1 | 11.4 (copolymer) | 3.89 | 1.22 |

The difference in the amount of carbon remaining on the two samples after extraction suggest that a larger amount of copolymer than of the PDMS homopolymer is attached to the silica surface. Indeed, while the percent of carbon of Sample 1 after extraction is about 50% higher than the sample 16, the $^{29}$Si NMR data suggest that the number of siloxane groups directly attached to the surface of Sample 1 is 4-5 times of that attached to Sample #16 (see FIG. 3). The NMR results also imply that a higher quantity of polymer chains and loops from the hydromethylsiloxane copolymer were attached on the silica (Sample 1) than from the PDMS homopolymer and that the polymer chains and loops from the hydromethylsiloxane copolymer were shorter than those from the PDMS homopolymer.

Comparative Example 2

Sample 17—High Temperature Treatment of Fumed Silica with PDMS $^{29}$Si—NMR spectra of a PDMS-treated fumed silica (Cab-O-Sil™ TS-720, Cabot Corporation, Sample 17) were obtained as described above and are shown in FIG. 3 (Spectrum a). The unique structural features of the silica treated with hydrosiloxane copolymer in solvent (Spectrum e—Sample 1) can be clearly seen from a comparison of its $^{29}$Si NMR spectra with the spectra of silica treated with dimethylsiloxane polymer either in solvent (Spectrum d—Sample 16) or at high temperature without solvents (Spectrum a—Sample 17).

Figure 3:
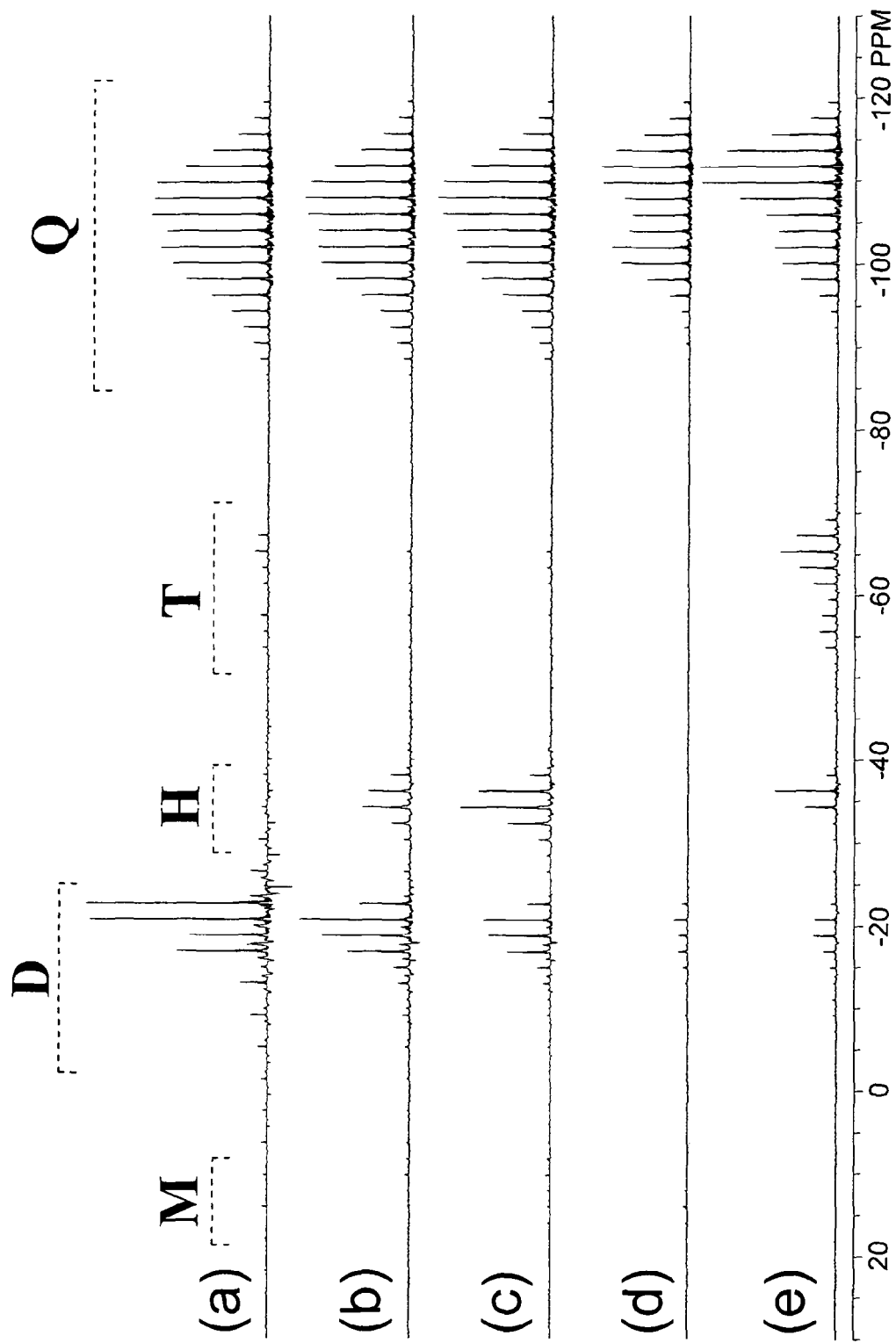
FIG. 3 is the $^{29}$Si CP/CPMG/MAS NMR spectra of a) Cab-O-Sil™ TS-720 (Sample 17), b, c) fumed silica treated with methylhydrosiloxane-dimethylsiloxane copolymers at high temperature (Samples 18 and 19, respectively), d) colloidal silica treated with PDMS in isopropyl alcohol and water at 70° C. under basic conditions (Sample 16), and e) a colloidal silica according to an exemplary embodiment of the invention (Sample 1).

As can be seen from FIG. 3, much higher amounts of the T units were attached to the copolymer-treated silica than to PDMS-treated silica. Also, significant amount of hydrides remain on the copolymer-treated silica. The reactivity of the hydride may be exploited through post-treatment to introduce additional functional groups on the surface. After treatment in solvent under the same conditions, there are many more directly surface attached siloxane groups from the hydrosiloxane copolymer (M+D+T+H) than from PDMS homopolymer (M+D).

In addition, multiple siloxyl groups on a single copolymer chain were attached on the surface, as evidenced by the high proportion of T-type attachments, in contrast to the one or two points of attachment typically made by PDMS chains. No T-type attachment was detected on silica treated with silica treated with PDMS homopolymer in solvent (Sample 16). During dry treatment at high temperature, oxidation of the methyl group breaks the methyl-silicon bond, freeing the silicon atom to become attached to the surface of the metal oxide particle via the T-type chemical attachments evidenced in FIG. 3; however, treatment with the hydrosiloxane copolymer in solvent results in far more of these attachments of silicon atoms along the polymer backbone to the silica surface due to hydrolysis of the hydrosiloxane units.

The multiple points of attachment of the hydrosiloxane copolymer in Sample 1 are expected to render the polymer significantly less mobile than on Sample 16. This has been confirmed by proton NMR.

Comparative Example 3

Samples 18 and 19—High Temperature Treatment of Fumed Silica with Methylhydrosiloxane-dimethylsiloxane Copolymer 50 g of methylhydrosiloxane-dimethylsiloxane copolymer (Sample 18: CAS #68037-59-2 Mn=1900-2000, viscosity 25-35 cSt, mol % of [Me(H)HSiO] 25-30%; Sample 19: CAS #68037-59-2 Mn=900-1200, viscosity 10-15 cSt, mol % of [Me(H)SiO] 50-55%) was combined with 50 g tetrahydrofuran (THF) in a spray bottle. 350 g of Cab-O-Sil™ M-5 fumed silica (product of Cabot Corporation, 200 m²/g surface area) was sprayed with 70 g of the copolymer/THF blend in a 5 gal pail, with mixing of silica upon each addition. The pail was sealed and rolled on a roll mill for 2 hours, after which, the silica was transferred into a 5 gallon Parr reactor. The reactor was purged with nitrogen at a flow rate of 2.5 L/min for 30 minutes, in order to ensure a completely inert environment before heating. The set point was adjusted to 335° C. and the stirrer was started at approximately 60 rpm. It took 60 minutes to reach an internal temperature reading of 260° C., at which point the timer was started. The timer was stopped at 34 minutes, the time it took for the internal temperature to reach 290° C. The heater and stirrer were shut off, and the hot silica was removed from the bottom of the Parr reactor in a "hot dump" manner. The nitrogen purge was reduced to 0.3 L/min and the reactor was allowed to cool overnight.

$^{29}$Si CPMG MAS NMR spectra of Sample 18 and Sample 19 are shown in FIG. 3 in comparison with the spectrum for Cab-O-Sil™ TS-720 (Spectrum a, Sample 17), a commercial product available from Cabot Corporation. Table 8 lists the number M, D, H, and T functional groups per nm² of the surface as calculated from the $^{29}$Si CPMG MAS spectra, assuming a silica surface area of is 200 m²/g.

TABLE 8

| Sample | M | D | H | T | M + D + T + H |
|---|---|---|---|---|---|
| 18 | 0.06 | 0.69 | 0.68 | 0.08 | 1.51 |
| 19 | 0.08 | 0.46 | 1.21 | 0.15 | 1.90 |
| TS-720 | 0.06 | 1.03 | 0 | 0.33 | 1.42 |

The spectra in FIG. 3 show that even after treatment at 290° C., only a very small amount of T-type attachment was observed for the silica treated with methylhydrosiloxane-dimethylsiloxane copolymer. Instead, most of the hydromethylsiloxane groups from the copolymer were attached to the surface via D-type attachments. In contrast, the spectrum of the silica treated with the copolymer at low temperature in solvent (Sample 1, Spectrum e) has a far greater proportion of T-type groups bound to the surface of the silica, indicating that a greater proportion of the copolymer is covalently attached to the silica via multiple attachment points per chain.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of preparing hydrophobic silica particles comprising:
   a) providing a hydrosiloxane agent having the following formula

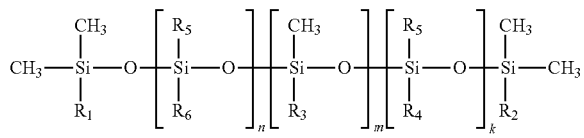

wherein $R_1$=—H, —$CH_3$,
   $R_2$=—H, —$CH_3$,
   $R_3$=—$CH_3$, —$CH_2CH_3$, —$CH_2CH_2CH_3$, —$CH_2Ar$, —$CH_2CH_2Ar$, —Ar, —$CH_2CH_2CF_3$, or —$CH_2CH_2$—$R_f$ with $R_f$ being a $C_1$ to $C_8$ perfluoroalkyl group,
   $R_4$=—$CH_3$, —$CH_2CH_3$, —$CH_2CH_2CH_3$, —$CH_2CH_2CF_3$, or —$CH_2CH_2$—$R_f$ with $R_f$ being a $C_1$ to $C_8$ perfluoroalkyl group,
   $R_5$=—$CH_3$, —$CH_2CH_3$, —$CH_2Ar$, —$CH_2CH_2Ar$, or —Ar,
   $R_6$=—H, —OH, —$OCH_3$, or —$OCH_2CH_3$,
   Ar is unsubstituted phenyl or phenyl substituted with one or more methyl, halogen, ethyl, trifluoromethyl, pentafluoromethyl, or —$CH_2CF_3$ groups,
   n, m, and k are integer numbers; n≥1, m≥1, k≥0, and wherein the hydrosiloxane agent has a number average molecular weight from 282 to about 20,000;
   b) contacting silica particles with the hydrosiloxane agent in the presence of a solvent, the solvent, silica particles, and hydrosiloxane agent forming a reaction mixture, wherein the reaction mixture has a pH from about 2 to about 6 or from about 8 to about 12 and wherein, when $R_6$ is —H, the solvent comprises at least one of water, methanol, and ethanol; and
   c) drying the reaction mixture to provide hydrophobic silica particles.

2. The method of claim 1, wherein the silica particles are colloidal silica particles, fumed silica particles, co-fumed silica particles, or precipitated silica particles.

3. The method of claim 1, wherein step b) comprises dispersing the hydrosiloxane agent in an aqueous dispersion of the silica particles.

4. The method of claim 1, wherein the reaction mixture comprises a second treatment agent.

5. The method of claim 1, further comprising adding a second treatment agent to the reaction mixture.

6. The method of claim 1, wherein the method further comprises combining a second treatment agent with a dispersion of the silica particles before step b).

7. The method of claim 4, wherein the second treatment agent is a hydrophobizing agent or a charge modifying agent.

8. The method of claim 1, wherein step a) comprises modifying a hydrosiloxane precursor having the following formula:

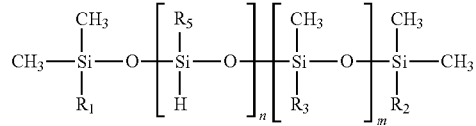

wherein $R_1$=—H, —$CH_3$,
   $R_2$=—H, —$CH_3$,
   $R_3$=—$CH_3$, —$CH_2CH_3$, —$CH_2CH_2CH_3$, —$CH_2Ar$, —$CH_2CH_2Ar$, —Ar, —$CH_2CH_2CF_3$, or —$CH_2CH_2$—$R_f$ with $R_f$ being a $C_1$ to $C_8$ perfluoroalkyl group,
   $R_5$=—$CH_3$, —$CH_2CH_3$, —$CH_2Ar$, —$CH_2CH_2Ar$, or —Ar,
   Ar is unsubstituted phenyl or phenyl substituted with one or more methyl, halogen, ethyl, trifluoromethyl, pentafluoromethyl, or —$CH_2CF_3$ groups,
   n and m are integer numbers; n≥1, m≥1, and wherein the hydrosiloxane precursor has a number average molecular weight from 282 to about 20,000,
   by chemically modifying at least a portion of the Si—H groups.

9. The method of claim 8, wherein chemically modifying comprises replacing the hydride on at least a portion of the Si—H groups with at least one of an alkoxide, a hydroxide, or —$CH_3$, —$CH_2CH_3$, —$CH_2CH_2CH_3$, —$CH_2CH_2CF_3$, or —$CH_2CH_2R_f$ with $R_f$ being a $C_1$ to $C_8$ perfluoroalkyl group.

10. The method of claim 1, wherein the solvent comprises a water-miscible organic solvent.

11. Hydrophobic silica particles prepared by a method comprising:
   a) providing a hydrosiloxane agent having the following formula

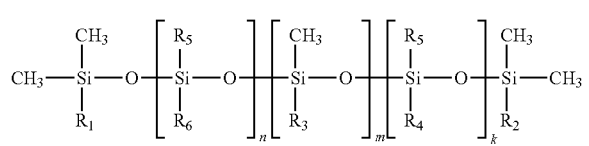

wherein R$_1$=—H, —CH$_3$,
R$_2$=—H, —CH$_3$,
R$_3$=—CH$_3$, —CH$_2$CH$_3$, —CH$_2$CH$_2$CH$_3$, —CH$_2$Ar, —CH$_2$CH$_2$Ar, —Ar, —CH$_2$CH$_2$CF$_3$, or —CH$_2$CH$_2$—R$_f$ with R$_f$ being a C$_1$ to C$_8$ perfluoroalkyl group,
R$_4$=—CH$_3$, —CH$_2$CH$_3$, —CH$_2$CH$_2$CH$_3$, —CH$_2$CH$_2$CF$_3$, or —CH$_2$CH$_2$—R$_f$ with R$_f$ being a C$_1$ to C$_8$ perfluoroalkyl group,
R$_5$=—CH$_3$, —CH$_2$CH$_3$, —CH$_2$Ar, —CH$_2$CH$_2$Ar, or —Ar,
R$_6$=—H, —OH, —OCH$_3$, or —OCH$_2$CH$_3$,
Ar is unsubstituted phenyl or phenyl substituted with one or more methyl, halogen, ethyl, trifluoromethyl, pentafluoromethyl, or —CH$_2$CF$_3$ groups,
n, m, and k are integer numbers; n≥1, m≥1, k≥0, wherein the hydrosiloxane agent has number average molecular weight from 282 to about 20,000;
b) contacting silica particles with the hydrosiloxane agent in the presence of a solvent, the solvent, silica particles, and hydrosiloxane agent forming a reaction mixture, wherein the reaction mixture has pH from about 2 to about 6 or from about 8 to about 12; and
c) drying the reaction mixture to provide the hydrophobic silica particles.

12. The hydrophobic silica particles of claim 11, wherein the reaction mixture has a pH from about 2 to about 6 or from about 8 to about 12.

13. The hydrophobic silica particles of claim 11, wherein the silica particles are colloidal silica particles, fumed silica particles, co-fumed silica particles, or precipitated silica particles.

14. The hydrophobic silica particles of claim 11, wherein step b) comprises dispersing the hydrosiloxane agent in an aqueous dispersion of the silica particles.

15. The hydrophobic silica particles of claim 11, wherein the reaction mixture comprises a second treatment agent.

16. The hydrophobic silica particles of claim 11, further comprising adding a second treatment agent to the reaction mixture.

17. The hydrophobic silica particles of claim 11, wherein the method further comprises combining a second treatment agent with a dispersion of the silica particles before step b).

18. The hydrophobic silica particles of claim 15, wherein the second treatment agent is a hydrophobizing agent or a charge modifying agent.

19. The hydrophobic silica particles of claim 11, wherein step a) comprises modifying a hydrosiloxane precursor having the following formula:

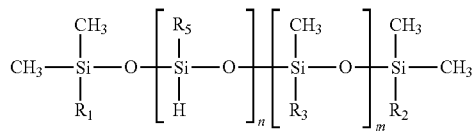

wherein R$_1$=—H, —CH$_3$,
R$_2$=—H, —CH$_3$,
R$_3$=—CH$_3$, —CH$_2$CH$_3$, —CH$_2$CH$_2$CH$_3$, —CH$_2$Ar, —CH$_2$CH$_2$Ar, —Ar, —CH$_2$CH$_2$CF$_3$, or —CH$_2$CH$_2$—R$_f$ with R$_f$ being a C$_1$ to C$_8$ perfluoroalkyl group,
R$_5$=—CH$_3$, —CH$_2$CH$_3$, —CH$_2$Ar, —CH$_2$CH$_2$Ar, or —Ar,
Ar is unsubstituted phenyl or phenyl substituted with one or more methyl, halogen, ethyl, trifluoromethyl, pentafluoromethyl, or —CH$_2$CF$_3$ groups, n and m are integer numbers; n≥1, m≥1, and wherein the hydrosiloxane precursor has a number average molecular weight from 282 to about 20,000,
by chemically modifying at least a portion of the Si—H groups.

20. The hydrophobic silica particles of claim 19, wherein chemically modifying comprises replacing the hydride on at least a portion of the Si—H groups with at least one of an alkoxide, a hydroxide, or —CH$_3$, —CH$_2$CH$_3$, —CH$_2$CH$_2$CH$_3$, —CH$_2$CH$_2$CF$_3$, or —CH$_2$CH$_2$—R$_f$ with R$_f$ being a C$_1$ to C$_8$ perfluoroalkyl group.

21. The hydrophobic silica particles of claim 11, wherein the solvent comprises a water-miscible organic solvent.

22. A particle composition comprising the reaction product of a solvent dispersion of silica particles at a pH from about 2 to about 6 or from about 8 to about 12 and at least a hydrosiloxane agent having the formula

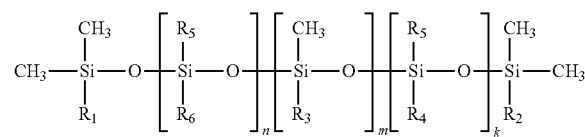

wherein R$_1$=—H, —CH$_3$,
R$_2$=—H, —CH$_3$,
R$_3$=—CH$_3$, —CH$_2$CH$_3$, —CH$_2$CH$_2$CH$_3$, —CH$_2$Ar, —CH$_2$CH$_2$Ar, —Ar, —CH$_2$CH$_2$CF$_3$, or —CH$_2$CH$_2$—R$_f$ with R$_f$ being a C$_1$ to C$_8$ perfluoroalkyl group,
R$_4$=—CH$_3$, —CH$_2$CH$_3$, —CH$_2$CH$_2$CH$_3$, —CH$_2$CH$_2$CF$_3$, or —CH$_2$CH$_2$—R$_f$ with R$_f$ being a C$_1$ to C$_8$ perfluoroalkyl group,
R$_5$=—CH$_3$, —CH$_2$CH$_3$, —CH$_2$Ar, —CH$_2$CH$_2$Ar, or —Ar,
R$_6$=—H, —OH, —OCH$_3$, or —OCH$_2$CH$_3$,
Ar is unsubstituted phenyl or phenyl substituted with one or more methyl, halogen, ethyl, trifluoromethyl, pentafluoromethyl, or —CH$_2$CF$_3$ groups,
n, m, and k are integer numbers; n≥1, m≥1, and wherein the hydrosiloxane agent has a number average molecular weight from 282 to about 20,000.

23. The particle composition of claim 22, wherein the silica particles are colloidal silica particles, fumed silica particles, co-fumed silica particles, or precipitated silica particles.

24. The particle composition of claim 22, wherein the particle composition is the reaction product of silica particles with a hydrosiloxane agent and a second treatment agent.

25. The particle composition of claim 24, wherein the second treatment agent is a hydrophobizing agent or a charge-modifying agent.

26. The particle composition of claim 22, wherein the reaction product is in the form of a dry powder.

27. A toner composition comprising toner particles and the reaction product of a solvent dipersion of silica particles at a pH from about 2 to about 6 or from about 8 to about 12 and at least a hydrosiloxane agent having the formula

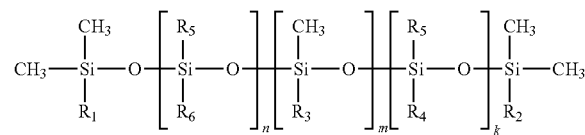

wherein $R_1$=—H, —$CH_3$, $R_2$=—H, —$CH_3$, $R_3$=—$CH_3$, —$CH_2CH_3$, —$CH_2CH_2CH_3$, —$CH_2Ar$, —$CH_2CH_2Ar$, —Ar, —$CH_2CH_2CF_3$, or —$CH_2CH_2$—$R_f$ with $R_f$ being a $C_1$ to $C_8$ perfluoroalkyl group, $R_4$=—$CH_3$, —$CH_2CH_3$, —$CH_2CH_2CH_3$, —$CH_2CH_2CF_3$, or —$CH_2CH_2$—$R_f$ with $R_f$ being a $C_1$ to $C_8$ perfluoroalkyl group, $R_5$=—$CH_3$, —$CH_2CH_3$, —$CH_2Ar$, —$CH_2CH_2Ar$, or —Ar, $R_6$=—H, —OH, —$OCH_3$, or —$OCH_2CH_3$, Ar is unsubstituted phenyl or phenyl substituted with one or more methyl, halogen, ethyl, trifluoromethyl, pentafluoromethyl, or —$CH_2CF_3$ groups, n, m, and k are integer numbers; n≥1, m≥1, k≥0 and wherein the hydrosiloxane agent has a number average molecular weight from 282 to about 20,000.

28. The toner composition of claim 27, wherein the silica particles are colloidal silica particles, fumed silica particles, co-fumed silica particles, or precipitated silica particles.

29. The toner composition of claim 27, wherein the reaction product is the reaction product of silica particles and both a hydrosiloxane agent and a second treatment agent.

30. The toner composition of claim 29, wherein the second treatment agent is a hydrophobizing agent or a charge-modifying agent.

* * * * *

UNITED STATES PATENT AND TRADEMARK OFFICE
CERTIFICATE OF CORRECTION

| | | |
|---|---|---|
| PATENT NO. | : 8,895,145 B2 | Page 1 of 1 |
| APPLICATION NO. | : 13/639548 | |
| DATED | : November 25, 2014 | |
| INVENTOR(S) | : Alyson M. Christopher et al. | |

It is certified that error appears in the above-identified patent and that said Letters Patent is hereby corrected as shown below:

In the Claims

At column 29, line 11, and column 30, line 37, that portion of the formula reading "$R_6$ = -H, -OH, -OCH$_3$, or -OCH$_2$CH$_3$," should read --$R_6$ = -OH, -OCH$_3$, or -OCH$_2$CH$_3$,--

Signed and Sealed this
Nineteenth Day of May, 2015

Michelle K. Lee
*Director of the United States Patent and Trademark Office*